Figure 1:
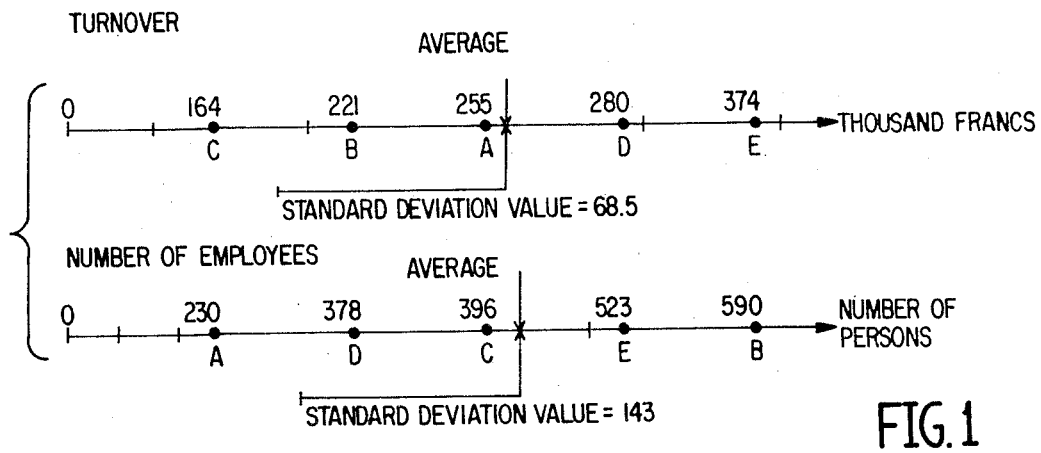

United States Patent

[11] 3,628,904

| [72] | Inventor | Jean Francois Canguilhem |
| | | 35 rue de la Rangee, 92 Garches, France |
| [21] | Appl. No. | 607,301 |
| [22] | Filed | Jan. 4, 1967 |
| [45] | Patented | Dec. 21, 1971 |
| [32] | Priority | Jan. 1, 1966 |
| [33] | | France |
| [31] | | 44961 |

[54] COMPUTER PROGRAMMING
8 Claims, 12 Drawing Figs.

[52] U.S. Cl. .................................................. 444/1
[51] Int. Cl. .................................................. G06f 7/00

[50] Field of Search ............................................. 340/172.5

[56] References Cited
UNITED STATES PATENTS

| 3,343,132 | 1967 | Hanson et al. ............... | 340/172.5 |
| 3,413,454 | 1968 | Frankel ....................... | 340/172.5 X |

*Primary Examiner*—Eugene G. Botz
*Assistant Examiner*—Edward J. Wise
*Attorney*—Bacon & Thomas

ABSTRACT: A system of measurement known as dimensional synthesis to give quantitative measure to multidimensional subjective concepts.

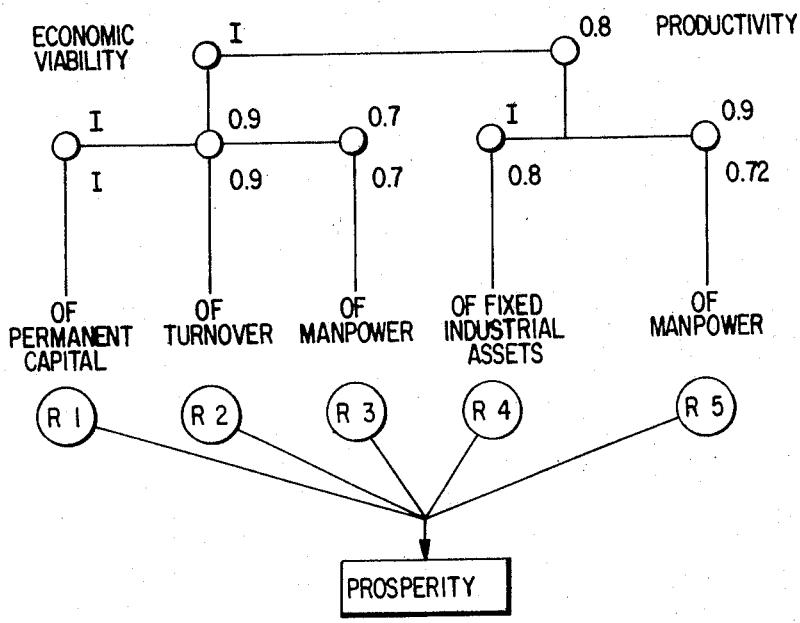
FIG. 3 HIERARCHICAL DISTRIBUTION OF THE FACTORS INVOLVED IN RUNNING A COMPANY
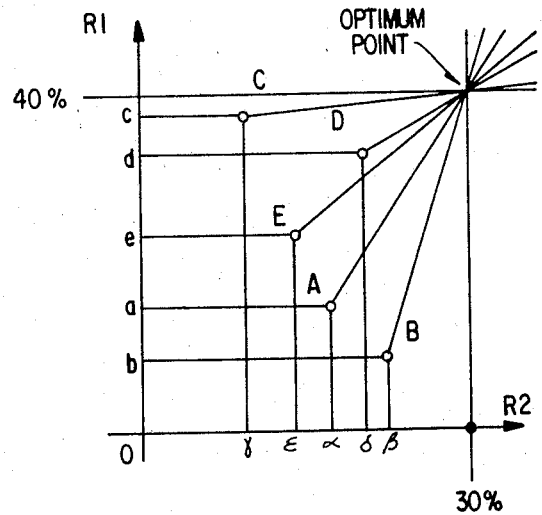
FIG. 4
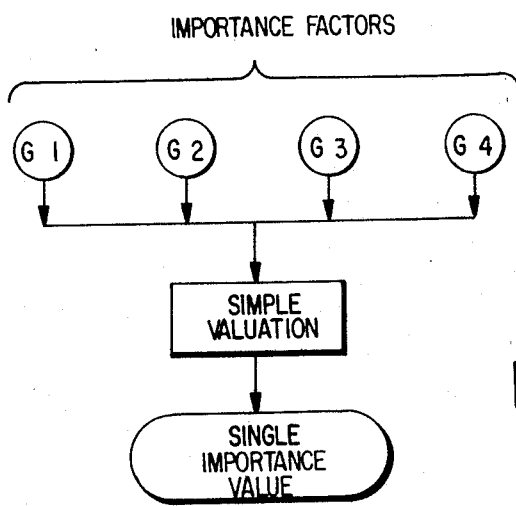
FIG. 5
INVENTOR
JOHN FRANCOIS CANGUILHEM INVENTOR
JOHN FRANCOIS CANGUILHEM
BY Bacon & Thomas ATTORNEYS IMPORTANCE AND PROSPERITY VALUES FOR
ALL FIRMS IN THIS SECTOR OF ACTIVITY
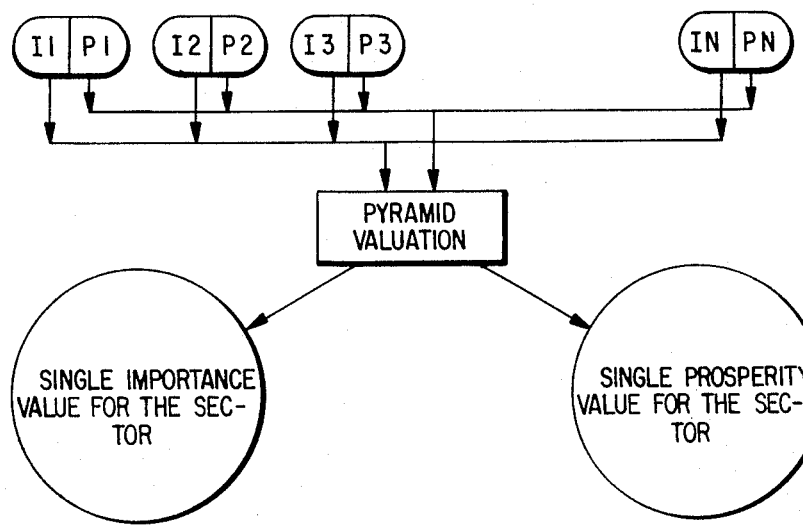
FIG. 8
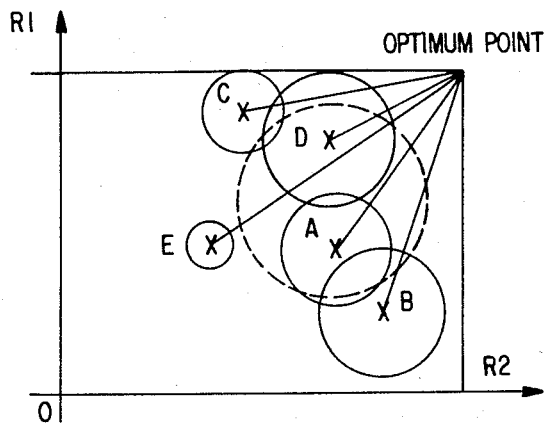
FIG. 10
FIG. 11
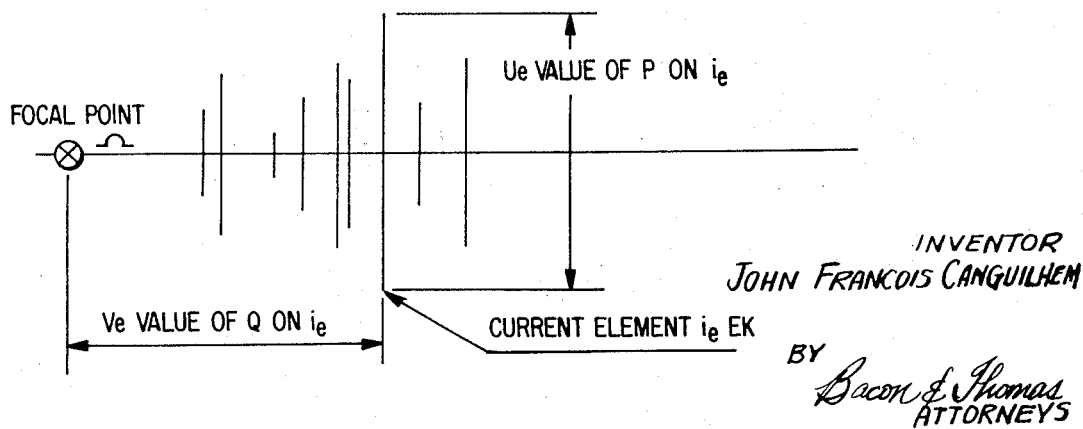
INVENTOR
JOHN FRANCOIS CANGUILHEM
BY
Bacon & Thomas
ATTORNEYS

COMPUTER PROGRAMMING

BACKGROUND OF THE INVENTION

The present invention has as its purpose the processing of multidimensional subjective concepts in order to measure them and to this end has as objects:

a. first a new method of measurement known as "dimensional synthesis" which may be industrially used to quantitatively express a multidimensional, subjective concept according to a certain predetermined law, and by a single numerical value, and b. second to create particular computing devices for use with the method, programs for electronic computers formed by any possible combination of subsidiary programs may be used to operate the computer as a measuring apparatus.

The object of the application is also a specific material means for use with the method and comprising programs formed by the combination of prefabricated subsidiary programs.

Hitherto, methods of data processing using computers could only be applied to the processing of physical measurable quantities and did not extend to subjective concepts such as difficulty, urgency, competence, prosperity, quality etc. which are multidimensional and have therefore considered to be unmeasurable and derived solely from the criterion of appreciation, intuition or experience.

In fact, these subjective concepts constitute a very considerable part of the phenomena of our daily life in industry, social activities, politics, military affairs etc.

In the world of industry, for instance, the head of an enterprise, such as a director or other responsible person, must if he is to run his business well, compare, classify and follow the development of a large number of concepts such as the importance of his factory, the importance of a given job, the difficulty involved in a certain task, the quality of his products, the prosperity of his subsidiaries, the scope of his responsibility and the extent of competition.

Generally speaking, in order to assess a phenomenon it is necessary to determine the value of things, the value of men, and the value of situations concerned in the phenomenon, and these values cannot, at present, be determined by measurement.

The precise aim of the invention is to provide a method and a means which will enable these concepts to be measured and thus taken into account when studying problems in which they constitute factors.

The work "problem" is used to denote any particular case in which a question is asked and requires an answer. Thus it may be necessary to assess the value of a team of men running a certain business and this constitutes a problem in the sense of the word, as does the choice of a commercial director in another company, the choice of publicity to be used to support a sales campaign for a certain product, the determination of the overall importance and prosperity of a network of interests and subsidiaries in a given financial group etc. The problems to which the invention enables a solution to be supplied are numerous.

Figure 2:
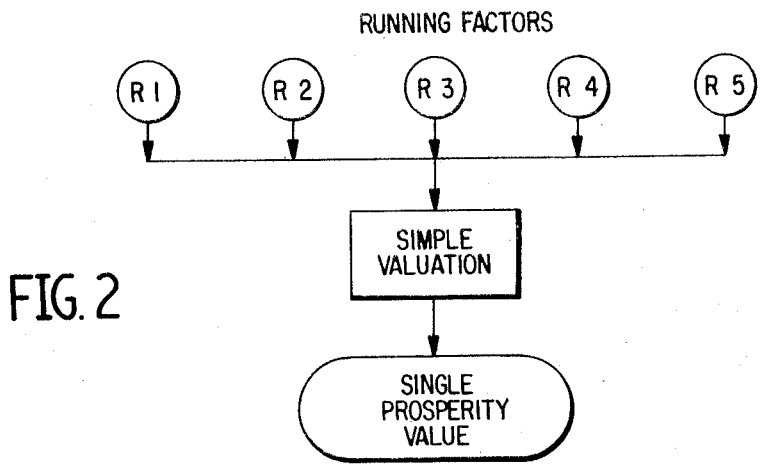
Figure 9:
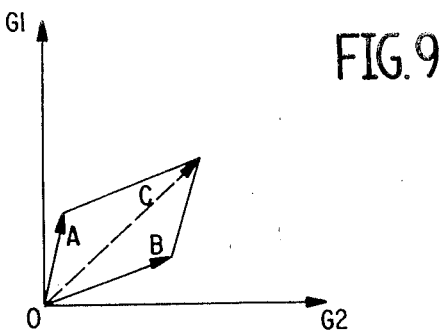
Figure 6:
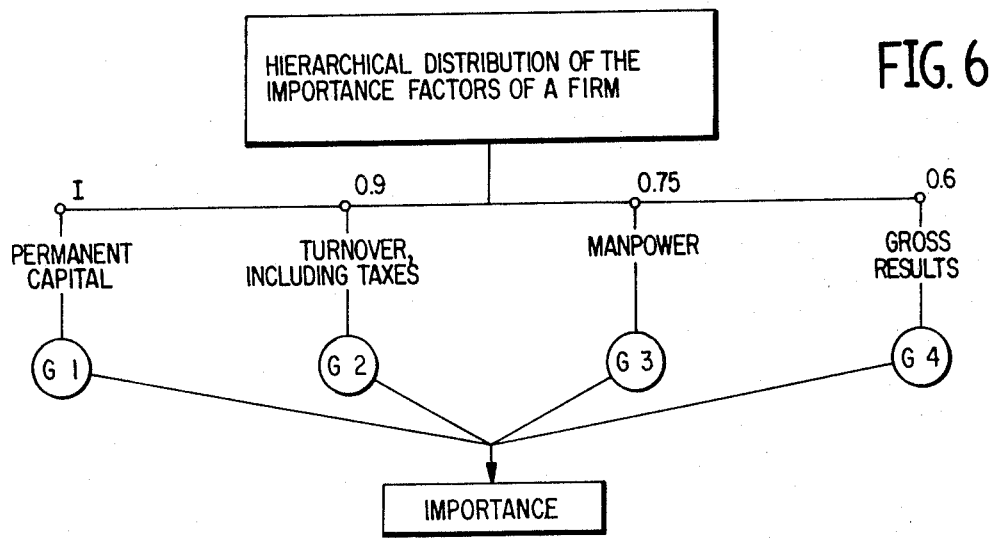
Figure 7:
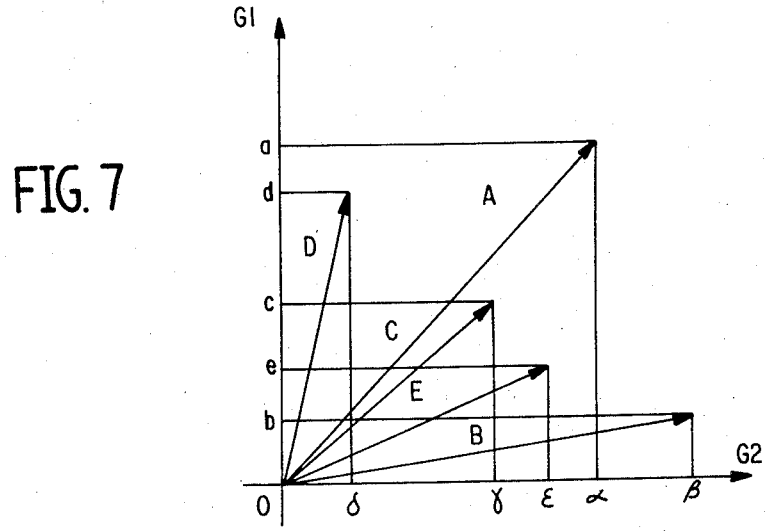
Figure 12:
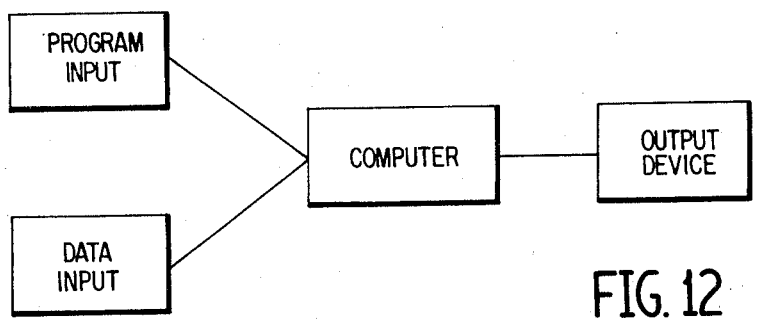

Other objects and features of the present invention will become clear from the following description of the invention as illustrated by the drawings wherein:

FIG. 1 is a distribution diagram of factory turnover and number of employees,

FIGS. 2 and 3 illustrate the simple valuation technique based on running factor ratios, FIG. 4 shows a two-dimensional plot of a product value of state, FIGS. 5 and 6 illustrate the simple valuation technique with only one level of distribution, FIG. 7 shows a two-dimensional vector plot of a product value of being, FIGS. 8, 9 and 10 illustrate the pyramid valuation technique, FIG. 11 shows a spectrum of a part of the basic image group, and FIG. 12 is a block diagram of the computer and input-output devices.

INTRODUCTION

The concept of "information model," which was recently introduced into a number of large-scale enterprises by data processing specialists, has the advantage of permitting the regrouping in a single pyramid of the whole field of data processing by computer.

As compared with the actual model (pattern) and the theoretical model (the descriptive or mathematical expression) the information model is merely the representation of the structure of the phenomenon to be modelized, programmed on a computer.

Modelization is used to mean the creation and use of information models.

"Dimensional Synthesis" is a scientific method of modelization and is a true method of measurement, the essential feature of which is to supply the means for providing quantified values for concepts which are of a subjective nature and multidimensional and which have therefore hitherto been regarded as unmeasurable and thus nonassessable for purposes of data processing by computer.

Such concepts as importance, difficulty, urgency, competence, quality etc. play an important role in every sphere of life and the fact that it is possible to express these subjectively conceived ideas with their implications and nuances, the terms of quantity and measurements is the first step towards great progress in the field of modelization, since all the traditional mathematical means and the computerized methods now associated therewith have suddenly been made available to all to enable them rationally to grasp these concepts.

How should one go about choosing a car? This is a simple example of a problem which is part of everyday experience and which may be used to illustrate the possibilities of dimensional synthesis.

Having a given purpose in mind (such as buying a car for use in town), it is necessary to assess the cars on the market. In order to make such an assessment, it is necessary to measure the value of each of them in a single figure. Now each car is characterized by a large number of factors:

a. Economic factors: gasoline consumption, price, frequency of breakdowns, ease with which spare parts are obtained etc.

b. Safety factors: road holding, steering, braking distance, heating losses, maneuverability etc.

c. Mechanical factors: maximum speed, acceleration, gearbox and other components;

d. Body work factors: passenger accommodation, trunk space, window area, appearance etc.

e. Comfort factors: suspension, seating, running noise, ventilation etc.

There are, therefore, about 30 different factors for which it is now possible to provide a separate measurement or assessment value.

Dimensional synthesis makes it possible to express in quantitative terms and as a single-figure value, each make of car considered, on the basis of all the values assessed for the various factors separately, i.e. to express in value terms the concept of the quality of a car with respect to the definite purpose for which it is required, the purpose being expressed by the greater importance attributed to certain factors relative to others, which is also dependent on the individual concerned.

Dimensional synthesis may be applied to problems in very varied fields of application, but whatever the nature of the elements involved, all these problems may be seen to possess a characteristic structure, and it is therefore on the basis of this concept of structure and not of the field of application that the problems to which dimensional synthesis may be applied have been classified.

The following five main categories are distinguished:

1. Problems involving SIMPLE VALUE ASSESSMENT.

Any single element, whether an object, an entity or an individual is included in this category, and a concept of quality, value, etc., associated with this element must be expressed in terms of quantity on the basis of a certain number of factors which may be measured separately and between which a hierarchical relationship has been established.

It may, for example, be desired to express as a numerical value either the total quality of a finished product assessed on the basis of a number of quality factors, the relative importance of which is a function of the very specific use to which the product is to be put, or the prosperity of an enterprise in a given sector of activity assessed on the basis of factors connected with the running of the enterprise such as profit margins, economic viability, etc.

2. Problems involving PYRAMID VALUE ASSESSMENT.

A group of elements, whether objects, entities or individuals, is dealt with in this category of problem. With all the elements in the group and with the group of elements as a whole, there is associated a concept of quality and it is this concept associated with the group which must be assessed in terms of quantity on the basis of the values assigned for this concept to each element.

This is the case, for instance, when it is desired to express in terms of measurement the value of a working team composed of persons or the difficulty of a task made up of a number of separate tasks, or the prosperity of an enterprise made up of a number of factories, offices etc.

The elements of a group may themselves be groups. Value assessment is then effected at successive levels, gradually—as indicated by the word "pyramid." The prosperity of a financial group, for example, will be determined on the basis of the prosperity of the various companies in the group, which is in turn assessed on the basis of the prosperity of their various departments which are in turn assessed on the basis of their services.

3. Problems involving SEQUENCING.

This category of problems relates to a group of elements, whether objects, entities or individuals, with which a value concept is associated, and which it is desired to arrange in regular order. In other words, it is desired to place the elements in order of preference according to the particular concept involved.

All problems of competition, selection and choice are included in this category.

4. Problems involving ASSOCIATION.

Among the elements of a group, whether objects, entities or individuals, with which a concept of value is associated, it is desired in the problems included in this category to determine all the groups of elements which are interassociated or all the elements associated with a given element, according to the concept involved.

Problems of association include those of change of living accommodation, matrimonial agencies and employment. Problems of counterfeiting and infringement of copyright are problems of association.

5. Problems involving OPTIMIZATION.

In this category, the elements are essentially situations in the process of development, and it is a question of determining how to proceed from a situation A to a situation B with a minimum wastage of energy.

The director of a firm may, for example, have decided to reach a certain stage in three years. What must be the respective parallel laws of evolution governing the number of his employees, his turnover, investments etc.? This is a problem of optimization.

The commissioning of a nuclear reactor is similarly a problem of optimization.

Each of these categories of problem has been assigned its corresponding branch of dimensional synthesis.

The description of these five branches is here preceded by an explanation of fundamentals, which is concerned with defining terms and establishing the basic principles of the method.

FUNDAMENTALS OF THE METHOD

General Remarks

The method of dimensional synthesis may be applied to obtain the solution of any type of problem which relates to objects, persons, or entities forming a group and known as the elements of the problem and with which there is associated a concept of quality, value, size, influence etc. which it is desired to express in quantitative terms, this concept being the result of the simultaneous consideration of a number of separate factors which may be measured or gauged separately, such as factors of quality, value, size, influence etc.

Dimensional synthesis modelizes this type of problem by representing the objects, individuals or entities concerned by elements in an N-dimensional vector space corresponding biunivocally to the N factors defining the concept which it is desired to express in terms of quantity. To this end the vector space is metricized, i.e. it is accorded a standard of measurement for lengths and distances by establishing a connection— in this case a hierarchical value relationship between the factors defining the concept. This connection is based on the fact that for a given problem and a given person charged with solving that problem, one factor will not carry the same weight as another. Thus the concept to be expressed in quantitative terms preserves its subjective character, the aim being not to remove the subjective element but on the contrary to understand it and express it as a measured value.

The essential feature of the method of dimensional synthesis relates to the method whereby the vector space of the problem is mathematically assigned a suitable standard of measurement which takes into account the considerations mentioned above.

The object of these general remarks is to state the basic principles according to which this standard of measurement is determined. In order to make this explanation as clear and as exact as possible, it is necessary to preface the statement of principles with a certain number of definitions which are characteristic of dimensional synthesis which makes use of a number of completely new concepts.

Before these definitions are given, here is a simple example to illustrate, without complex mathematics, the method whereby the standard of measurement is evolved.

The assigning of a standard of measurement to the vector space of a problem may also be expressed as finding an equivalence between the different factors taken in pairs and each preserving its own unit of measurement. In the meaning given to the term in dimensional synthesis, the equivalence between two factors is obtained by comparing the real distribution of the group of elements with respect to each of these two factors, taking into account the relationship of their respective hierarchical coefficients.

Let us assume, for example, that the managing director of a company wishes to assess in value terms the importance of a group of five factories A, B, C, D and E, and this concept of importance is defined by him, for the sake of simplicity, by two factors, as:

a. turnover, which to him is of greater importance, and b. number of employees.

The managing director considers that the importance of the turnover with respect to the number of employees in his concept of importance may be expressed as 1.3.

Let us assume that the distributions of the turnover and the number of employees of the five factories are as shown in FIG. 1.

Any statistical distribution is usually characterized by a certain number of parameters: average effective value, interval of variation, variance, standard deviation value, each of which expressions relates to one aspect of distribution.

In the present circumstances, in the sense given to it in dimensional synthesis, and assuming that it is desired to compare of the arrangement aspect two distributions, the equivalence is effected on the basis of the standard distance (weighted indication of the distance between the values with respect to the average).

i.e. 68.5 thousand francs for the turnover,
143 people for the number of employees.

The standard of measurement assigned to the two-dimension vector space of this problem is obtained by considering 68.5/1.3 or 52.5 thousand francs' turnover is the equivalent of 143 persons.

The word "step" is used to refer to the quantity which serves to express the equivalence of each factor to the others. The step of the turnover figure is 52.5, that of the employees is 143.

As soon as an equivalence has been established between all the factors in pairs, the vector space is assigned its standard of measurement; The unit of length in a two-dimensional diagrammatic scheme is easily determined as soon as the scales are fixed, i.e. as soon as the equivalence between, for example, 1 cm. of the abscissa and 1 cm. of the ordinate has been determined.

When the standard of measurement is based on consideration of the standard deviation value, as was the case when considering the importance of the five factories belonging to a company, it is said that the standard of measurement is free since the standard deviation value for each factor (calculated automatically) is liable to change whenever the data of the problem vary—as would be the case, for example, were existing factories to be developed or a new factory set up. This gives to the standard of measurement a variable character which is prefectly suited to the study of groups considered in themselves, the comparisons only relating to the elements or internal parts of these groups.

If, on the other hand, the managing director of the company wishes to know his position with respect to his competitors and the aim of the problem thus posed is to effect comparisons between different groups and between factories belonging to different companies, the distributions of factors within which may be such as generally not to coincide on the scale of values then, this is no longer a case where the standard deviation value serves to determine the standard of measurement but becomes a case in which the interval of variations covering all distribution serves to determine the standard of measurement. In this case the standard of measurement is said to be imposed.

DEFINITIONS

This section contains definitions of the following terms:
a. generic element and current element
b. natural element and model element
c. natural group and model group
d. characteristic factors; these are the factors defining the concept to be expressed in quantitative terms
e. underlying spaces
f. product values; this is the concept to be expressed in quantitative terms.

Generic element and current element

In a given problem the generic element is the object, individual or entity in the problem considered purely as a generality. That is, the general object, individual or entity which is generally referred to by a common noun in the singular—the company, the shipyard, the candidate—while the problem is concerned with a whole group of companies, shipyards or candidates.

The current element is, on the other hand, a very specific particularization of the generic element. Company X is a current element. Generally speaking, every current element is known by its proper noun or by a specific reference symbol.

Natural element and model element

The natural element is the object, individual or entity involved in the problem considered as a physical whole. The model element is the conventional mathematical symbol used to represent the natural element.

It is very important to make a clear distinction between the natural and the model elements and not to confuse them. The model element may be determined as desired but it is impossible to define a natural element which exists outside mathematical thought.

Natural group and model group

The total number of current natural elements to which a problem relates constitutes the basic natural group for the problem.

The total number of current model elements constitutes the basic model group for the problem and is denoted by the symbol J.

The current natural elements of a single natural group may possess a certain number of laws of internal composition which serve to guide choice of the model elements which are to be used to represent them. For example:

If the basic natural group is the group of activities of an industrial enterprise, since the sum of the activities is still an activity, the model element chosen to represent the natural element "activity" is a vector.

If the basic natural group is the totality of solutions to a technical problem, since that the sum of a number of solutions does not constitute a solution, the model element chosen to express the natural element "solution" is a point.

Generally speaking, a natural element is represented by:
a VECTOR model element if the group of current elements in the basic natural group is a current element of the basic group,
a POINT element if the contrary is the case.

The letter $i$ is used to represent the generic model element whether point or vector.

The generic model element is denoted:
a. by the COMMON NOUN normally used to denote the natural element, e.g. company, shipyard, task, candidate, employee, solution etc.
b. by a definite group of N CHARACTERISTIC FACTORS, measurable physical quantities or assessment values such as age, diploma experience (as of candidate), sales price, site, type, fixed assets (as of a shipyard).

The current model element is denoted:
a. by a PROPER NOUN, for example that of the corresponding natural element, if it exists, thus Company A, B, X or Z.
b. by a NUMERICAL SYMBOL or arbitrary CODE which replaces the proper noun in programs;
c. by an INDEX $e$ which is known as the element index and varies between 1 and E, E being the finite number of current model elements which is obviously equal to the number of natural elements in the problem posed;
d. by a finite group of N VALUES assumed respectively by each of the characteristic factors of the generic element on the current element involved.

Characteristic factors—underlying spaces of J

Every characteristic factor is denoted by an index $n$, known as the factor index, which varies between 1 and N. The characteristic index $n$ factor is represented by the symbol $f_n$.

By definition, a characteristic factor is a measurable physical quantity or an elementary subjective value which may be expressed by symbol or an assessment value or by a value which is the result of a submodelization.

Thus, there is a law of correspondence or application of J in the body of the real numbers R which associates with every current model element $i_e$ the value $x_e^n$ which takes on itself the characteristic factor $f_n$.

The product of N applications generated by the N characteristic factors in an application of J to the Nth power of R, or $R^N$, which enables J to be considered:
a. either (if it is composed of vector elements) as a part of an N-dimensional real vector space product, related to a base which is the product of the bases of measurement for each of the factors and known as the UNDERLYING VECTOR SPACE of J and denoted by X;

b. or, (if it is composed of point elements) as a part of the reduced punctual space associated with X, related to the figure formed from the base of X and an origin which is a product of the origins of measurement of each of the factors, known as the UNDERLYING PUNCTUAL SPACE of J and denoted by $\mathfrak{x}$.

The base which is the product of the bases of measurement for each of the factors is known as the NATURAL BASE of the underlying vector space of J and is denoted by $b$.

The origin, which is the product of the origins of measurement of each of the factors, is known as the NATURAL ORIGIN of the underlying punctual space of J and is denoted by O.

Finally, the reference (O : $b$) is known as the NATURAL REFERENCE of the underlying punctual space of J.

Every vector element $i_e$ pertinent to J is defined in X, related to $b$ by the system of its N components: $(x^n)_e$, and every point element $i_e$ pertinent to J is defined in $\mathfrak{x}$, related to (O : $b$) by the system of its N coordinates: $(x^n)_e$.

The vector space X and its reduced space $\mathfrak{x}$ in which the basic image J may be assumed to be located, are the two fundamental spaces on which are based all the developments of dimensional synthesis. In particular, the group J is distributed in X or $\mathfrak{x}$, according to a "volumic" or "hyperspatial" DISTRIBUTION, the study of which is one of the objects of dimensional synthesis.

A priori, since this distribution is based upon two indices $e$ and $n$, it has no general direction, since the underlying vector is disjointed, i.e. has no assigned standard of measurement and only occurs as a group of N distributions "$e$" with an index, "$e$," each of which may be characterized by:

a. an interval of variation $(x_m^n, x_M^n)$, where $x_m^n$ is the lower limit and $x_M^n$ the upper limit of the values which may be assumed by the factor $f_n$;

b. a set of moments of which, essentially, the average value is $\mu^n$ and the standard deviation value $\sigma^n$.

The concept of product value—which is an original concept peculiar to dimensional synthesis—enables the juxtaposition of these N linear distributions to be converted into a coherent volumic distribution.

Product values

By definition, every product value of the generic element is a value which is essentially subjective and expresses a general concept associated with the generic element, being the result of the SIMULTANEOUS CONSIDERATION or of the PRODUCT of a number of independent characteristic factors, after a connection between them has been established by a hierarchical distribution or arrangement.

The hierarchy established among the characteristic factors of a single product value is obviously peculiar to the individual establishing it and a function of a given purpose. This is what causes its subjective character as defined.

The following are a few examples of product values:

a. the IMPORTANCE of an industrial enterprise which is the result of the simultaneous consideration of a number of important factors such as turnover, capital, fixed industrial assets, manpower etc.

b. the QUALITY of a finished product, also the result of a number of quality factors such as shock resistance, resistance to pressure, weight, size, etc. (in the case of a glass bottle for example);

c. the DIFFICULTY of a task, which is again the result of the simultaneous consideration of a number of difficulty factors. The construction of a road, for instance, is a task influenced by difficulty factors such as topography, geology, condemnation of property, distance from a town, availability of labor locally, etc.

According to the particular circumstances, for example depending upon the use to which an object it is to be put, the contribution of the different factors in producing the overall concept will vary. Factors such as shock resistance and size of a glass bottle may be more important the weight factor, which is in turn considered as being of greater importance than the resistance-to-pressure factor. The hierarchical distribution of the factors is the expression of this inequality of influence.

Note that $G = (f_1 \times f_2 \times f_3 \ldots \times f_l \times \ldots f_L) \equiv \prod_{l \in \mathcal{L}} (f_l)$ total product value of the generic element.

The generic element is of L dimensions with respect to the value G.

With every value G there is associated the system of the L hierarchical coefficients ($k_1$) against the field of application of the group of factors defining G in the interval (0.1) which expresses the hierarchical arrangement of these factors.

The group of factors defining the product value G defines an L-dimensioned subordinate vector space of X, known as the VECTOR SPACE OF EVOLUTION of G and denoted by $X_G$. It also defines a reduced subordinate punctual space known as the PUNCTUAL SPACE OF EVOLUTION of G and denoted by $\mathfrak{x}_G$.

A distinction is made between two types of product value according to whether its support is in the nature of a vector or a point, viz.

a. the product values of BEING which express the amplitude of a vector model element, such as the size of a company or the importance of a task. These are absolute concepts which follow a law of addition; it is obvious that the size of a group of companies is a sum of the sizes of the companies forming the group and in the same way the importance of a group of tasks is the sum of the importance of the individual tasks constituting the group;

b. the product values of STATE which express a difference of comparison between two punctual elements, one being a reference element while the other is that to which the value is attached, e.g. the prosperity of a company or the difficulty of a task. These are concepts which are related to an ideal concept taken as a standard of reference and which do not follow a law of addition. The prosperity of a group of companies cannot be the total of the prosperities of the companies constituting the group and, in the same way, the difficulty of a group of tasks cannot be a total of the difficulties of all the tasks.

The underlying vector space of J is, when there is no product value, devoid of all cohesion. The concept of a product value which establishes a connection between the various characteristic factors which define it, by their hierarchical distribution, enables a STANDARD OF MEASUREMENT to be introduced into the subordinate space $X_G$ associated with this value, or, to express it more precisely, the cohesion allows a direction to be imparted to the distribution of the two indices of J in $X_G$.

This volumetric distribution with two indices $e$ and $n$ is defined by:

a. a FIELD OF VARIATION in the form of a parallelepiped, the sides of which are the intervals of variation of the L distributions "e" associated with the L factors defining G; and the two main peaks of this parallelepiped are known as:

a. the MINIMUM limiting element of coordinates $(x_m^1)$ and b. the MAXIMUM limiting element of coordinates $(x_M^L)$.

The straight line which joins these two peaks is known as the diagonal of the field and denoted by $\Delta$.

b. a PAVE-TYPE IN THE form of a parallelepiped, the sides of which are the standard deviation values of the L distributions "e" associated with the L factors defining G. This parallelepiped has a diagonal known as the pave-type DIAGONAL and also denoted by $\Delta$.

c. a WEIGHT CENTER, the center of gravity of the punctual elements of the group J in the punctual space of evolution $\mathfrak{x}_G$ which enables the base image group to be localized in the field of variation.

d. a second order moment with respect to the center of gravity and providing a concept of VARIANCE and STANDARD DEVIATION VALUE of J.

Etc.

This represents the use of traditional mathematical methods in a sphere which has hitherto been inaccessible.

STATEMENT OF THE BASIC PRINCIPLE OF DIMENSIONAL SYNTHESIS:

DEFINITION OF THE INTRINSIC STANDARD OF MEASUREMENT

ASSOCIATED WITH A PRODUCT VALUE

In the subordinate vector space of evolution of the product value $G:X_G$, an infinity of standards of measurement may be introduced. To this end it is sufficient to define in $X_G$ any scalar product.

Dimensional synthesis proposes to provide $X_G$ with a clearly determined standard of measurement, known as the INTRINSIC STANDARD OF MEASUREMENT and deduced from the following two principles:

The scalar product defined in the vector space of evolution of G, $X_G$ must be such:

IMPOSED FORM that the FIELD OF VARIATION, established on the natural base of $X_G$ : b, is a parallelepiped:
1. which is rectangular, i.e. the opposite faces of which are orthogonal,
2. in which the lengths of the opposite sides remain in the same relationship as that of the homologous hierarchical coefficients

FREE FORM

The PAVE-TYPE established on the natural base of $X_G$ : b is a parallelepiped:
a. which is rectangular, i.e. the opposite faces of which are orthogonal,
b. in which the lengths of the opposite sides remain in the same relationship as that of the homologous hierarchical coefficients.

If the distribution of J in $\infty_G$ is not localized but distributed throughout the field, the two forms of the intrinsic standard of measurement practically coincide since the two parallelepipeds are then similar.

One of the essential processes of modelization according to the method of dimensional synthesis lies in determining this scalar product, which is known as scalar product SD and thus the standard of measurement stemming therefrom.

Let $g_{lm}$ be the terms of the linear form on the tensorial space product of $X_G$ multiplied by itself, $X_G \times X_G$, an expression of the scalar product SD defined in $X_G$ and related to the natural base $b$.

Let $\delta$ be a real number, generally between 1 and 100, known as the STANDARD, enabling the "grain" of the standard of measurement or its "power of separation" in $\infty_G$ (the reduced space) to be determined, this being reduced all the more as the value of $\delta$ increases.

On the basis of the principles stated above, and by definition of the scalar product, we have:

IMPOSED FORM;

$$g_{lm}=0 \text{ when } l \neq m$$

$$k_l k_m = g_{lm}\left(\frac{x_M^l - x_m^l}{\delta}\right)\left(\frac{x_M^m - x_m^m}{\delta}\right)$$

when $l = m$ or $$g_l = \frac{\delta^2 \cdot k_l^2}{(x_M^l - x_m^l)^2} = \frac{1}{\left(\frac{x_M - x_m}{\delta \cdot k_l}\right)^2}$$

The equation: $p_l = (x_M^l - x_m^l)/\delta \cdot k_l$ is known as the STEP of the factor $F_l$.

FREE FORM $(x_M^l - x_m^l)$ is substituted by $\sigma_l$:

$$g_l = \frac{\delta^2 \cdot k_l^2}{\sigma_l^2} \quad p_l = \frac{\sigma_l}{\delta \cdot k_l}$$

Generally speaking we have : $g_l = 1/p_l^2$

The concept of step is a concept of equivalence between factors, the step of a factor being expressed in the unit in which this factor is measured. This equivalence takes into account the hierarchy which has been established between the factors.

Once the terms $g_l$ have been determined, any distance in $\infty_G$ may be expressed, particularly the diagonal of the field of variation or of the pave type.

IMPOSED FORM:

$$\Delta = \sqrt{\sum_{l \in \mathscr{L}} g_l \cdot (\infty_M^l - \infty_m^l)^2} \text{ when } \mathscr{L} = (1,L)$$

FREE FORM:

$$\Delta = \sqrt{\sum_{l \in \mathscr{L}} g_l \cdot \sigma_l^2} \text{ when } \mathscr{L} = (1,L)$$

In both cases:

$$\Delta = \delta \sqrt{\sum_{l \in \mathscr{L}} k_l^2} \text{ when } \mathscr{L} = (1,L)$$

In order to simplify the formulation of the principles of dimensional synthesis hereinafter explained, which are based on the standard of measurement which has just been defined, it is interesting to effect a change of base in $X_G$ and a change of reference in $\infty_G$.

The BASE OF REFERENCE if $X_G$ provided with the intrinsic standard of measurement and indicated by the symbol $\beta$, the orthonormed base, i.e. the unitary and orthogonal base deduced from $b$.

If $\vec{\beta}_l$ are the vectors of this base, they are expressed in the natural base by $$\vec{\beta}_l = p_l \times \vec{b}_l$$

where $\vec{b}_l$ are the vectors of the natural base.

The change from natural base to base of reference is thus denoted by the diagonal matrix:

$$\begin{vmatrix} p_1 & & & & \\ & p_2 & & 0 & \\ & & \cdot & & \\ & & & p_l & \\ & 0 & & & \cdot \\ & & & & p_L \end{vmatrix}$$

Hence, since $(\xi')_e$ are the components of a vector element $i_e$ in the base of reference:

$$\xi^l = x^l / p_l$$

Moreover, any punctual element in the punctual space of evolution $\infty_G$ within the field of variation may be taken as a point of origin, particularly any OPTIMUM or FOCAL POINT $\Omega$ differing from the natural point of origin.

The OPTIMUM REFERENCE is the reference $(\Omega;\beta)$ in $\infty_G$.

If $(x_o^l)$ are the coordinates of $\Omega$ in the natural reference $(0 ; b)$ and $(\xi^l)$ are the coordinates of a punctual element in the optimum reference, they may be expressed by the following formula:

$$\xi^l = \frac{\infty^l - \infty_0^l}{p_l}$$

Finally, before proceeding to explain each branch of the theory associated with a large number of applications, it is advisable to define the concepts of balanced or imbalanced elements which are of general importance.

Let $(\xi')_e$ be the coordinates (or the components) of an element $i_e$ in $\infty_G$ (or $X_G$) related to the optimum reference or base of reference.

By definition, the term PARAMETER OF BALANCE of $i_e$, relatively to the two factors $fa$ and $fb$, is applied to the ratio $$\xi^a / \xi^b$$

By convention,
a. If this ratio is equal to 1, the element $i_e$ is fully balanced between *fa* and *fb*.
b. If this ratio is contained between 0.5 and 2, $i_r$ is balanced between *fa* and *fb*;
c. If the ratio is contained between 0.25 and 0.5 or between 2 and 4, $i_r$ is semibalanced between *fa* and *fb*;
d. Otherwise, $i_r$ is imbalanced between *fa* and *fb*.

The total of these parameters of balance arranged in tabular form for a model element relatively to all its factors taken in pairs, forms the MATRIX OF BALANCE of the model element under consideration.

The concept of the balance of an element enables a distinction to be made between different elements belonging to the same category of equivalence, such as spheres, cones etc. in $\infty c_t$ The main application of this concept is encountered when the natural generic element of the problem is the solution of a technical or economical problem.

Two solutions, one of which is balanced, and the other imbalanced, may be equivalent. The concept of balance enables them to be shared according to the temperament of the person responsible who may be rash or cautious and therefore prefer one or the other.

BRANCH 1

Extension of the method in order to apply it to the category of problems involving SIMPLE

VALUATION

The simple valuation of a group of elements relatively to a given product value consists in calculating for each current element, the value which this product value assumes.

EXAMPLE: STATEMENT OF THE FIRST PRINCIPLE OF

DIMENSIONAL SYNTHESIS

Let us assume a group of firms belonging, for example, to a given sector of industrial activity; electricity, food, textiles, public works, mechanical engineering etc.

The simple valuation of this group of companies relatively to the value "prosperity" consists in determining the prosperity value for each firm in this sector of activity on the basis of its running factors. By way of example the running factors of a firm, as shown in FIG. 2, may be the following five ratios:
R.1 the relationship between the net results and the permanent capital,
R.2 The relationship between the net results and the turnover not including taxes,
R.3 The relationship between the net results and manpower,
R.4 The relationship between the turnover not including taxes and fixed industrial assets,
R.5 The relationship between the turnover not including taxes and manpower.

The first three ratios express three aspects of the concept of economic viability, the last two express two concepts of productivity of industrial capital, one being related to equipment and the other to manpower.

Depending upon the sector of activity under consideration, the hierarchical distribution of the running factors will differ and depending upon whether a sector is very mechanized or not, the factors relating to manpower will have more or less importance (petrol and food sectors for example). The diagram shown in FIG. 3 gives a realistic distribution for a standard sector: mechanical engineering.

The method of calculation involved in simple valuation is simply illustrated in a plane such as a two-dimensional vector space shown in FIG. 4. The transposition to N dimensions preserves the same structure for the method of calculation and does not present any difficulty of comprehension.

Prosperity is a product value of state and by definition the companies are represented by punctual elements.

Since the standard of measurement is defined in the vector space, i.e. a unit of measurement of length and distance has a direction throughout the space, and since an OPTIMUM point represents an ideal of prosperity obtained by the conjunction of optimum values for all the factors given elsewhere, the distance from any point representing the model element of a firm to the optimum point is the prosperity value for this firm.

Note that the prosperity value of a firm decreases in inverse proportion to its prosperity. The importance of this inverse variation of the number expressing the measured value will be made clear when discussing branch 2.

The simple valuation of the same group of firms relatively to the value "importance" consists in determining the importance value for each of the firms in this sector of activity on the basis of the values of its importance factors as shown in FIG. 5. Importance factors for a firm may be:
G.1 = Permanent Capital
G.2 = Turnover not including taxes
G.3 = Manpower
G.4 = Gross results For this product value, too, the hierarchical distribution of the factors will not necessarily be the same from one sector of activity to another. The diagram shown in FIG. 6 gives a realistic distribution for a standard sector: mechanical engineering.

In the present case, the concept "importance" does not break down into subordinate concepts ("prosperity" would break down into such subordinate concepts as: economic viability and productivity) and the distribution of the importance factors occurs at one level only.

The method of calculation for simple valuation may be shown very simply in diagrammatic form in one plane (FIG. 7), by a product value of being, having as its support a vector element, as for a product value of state, the support of which is a punctual element:

Since the standard of measurement is defined in the vector space, the length of any vector constituting the model element of a firm is the importance value of that firm.

FORMAL STATEMENT OF THE FIRST PRINCIPLE OF
DIMENSIONAL SYNTHESIS—VALUATION OF A
MODEL ELEMENT

Let us assume the subordinate vector space of evolution of the product value G, of L dimensions, provided with the intrinsic standard of measurement and related to the base of reference $\beta$.

Let us assume the reduced subordinate punctual space $\infty c_q$ related to the optimum reference $(\Omega:\beta)$, where $\Omega$ is an OPTIMUM point of significance for the problem under consideration.

By definition, if G is a value of being, such as importance, its MEASUREMENT or its VALUE on the current vector element $i_e$, of components $(\xi^1)_e$ in $\beta$, is the NORM, in $X_G$ of this vector element, i.e.

$$\nu_G = \sqrt{\sum_{l \in \mathscr{L}} (\xi^1)^2} \text{ where } \xi^1 = \frac{X^1}{P^1}$$

By definition, if G is a value of state, such as prosperity, its MEASUREMENT or VALUE on the current punctual element $i_e$ of coordinates $(\xi^1)_e$ in $(\Omega:\beta)$ is the DISTANCE in $\infty c_G$, from this punctual element to the OPTIMUM point $\Omega$, i.e.

$$\nu_G = \sqrt{\sum_{l \in \mathscr{L}} (\xi^1)^2} \text{ where } \xi^1 = \frac{X^1 - X_0^1}{P^1}$$

RELATIVE VALUE AND ABSOLUTE VALUE

As has been defined above, the measurement of a product value G on a current punctual vector or element is known as a RELATIVE value, as opposed to the ABSOLUTE value obtained by relating this value to the length $\Delta$ of the diagonal in the field of variation, or of the pave type, so as to obtain a number contained between 0 and 100, while retaining an absolute significance whatever the number L of factors defining G, i.e. the number of dimensions of $X_G$, or the hierarchical distribution of these factors:

$$\nu_G{}^1 = \frac{100}{\Delta} \sqrt{\sum_{1\epsilon\mathscr{S}}(\xi^1)^2}$$

The concept of absolute value is very important since it makes it possible to compare:

a. either the values assumed by different product values which do not have the same number of dimensions, or in which the hierarchical arrangement of the factors varies;

b. or the values assumed by the same product value on the current elements for which one or more components or coordinates are unknown and which are therefore situated in subordinate vector spaces included in $X_G$, the number and dimension of which is less than L. In one or other of these cases, the diagonal $\Delta$ under consideration is obviously pertinent to the subordinate vector space under consideration.

BRANCH 2

Extension of the method in order to apply it to the category of problems involving:

PYRAMID VALUATION

The pyramid valuation of a number of elements relatively to a given product value consists in calculating the value which this product value assumes on the whole or part thereof, on the basis of the value it assumes on all the current elements.

EXAMPLE. STATEMENT OF THE SECOND PRINCIPLE OF DIMENSIONAL SYNTHESIS.

Let us assume a group of firms belonging to a given sector of activity. Simple valuation enabled a prosperity value and an importance value to be assigned to each firm. Pyramid valuation enables a single importance value and a single prosperity value to be assigned to the sector of activity taken as a whole (FIG. 8).

A value of being such as importance involves a simple vector addition as shown in FIG. 9.

The importance of the group C comprising the two companies A and B is the length of the vector sum of the vector model elements of the companies A and B.

For a value of state, the method of calculation is more complete. Here is an analogy drawn from mechanics which may help to make this clearer (FIG. 10).

We must imagine to be centered at each point representing a company in the vector space "prosperity," a mass proportional to the importance of this company. Each of these masses has a moment of inertia with respect to an optimum point which corresponds to a concept of "load." In fact, a company is heavier to manage the lower it is and the lower its degree of prosperity, i.e. as its distance from the optimum point increases.

Within the meaning of the second principle of dimensional synthesis, prosperity of the sector of activity is that of an imaginary company, the importance of which would be the arithmetical sum of the importances of the companies within the sector and to which there would correspond a load equal to the arithmetical sum of the loads of the companies in the sector, as also occurs in mechanics where a collection of masses may be replaced by a single mass which represents the sum of the masses, and the distance of which from the center of inertia may be calculated so that its moment of inertia is equal to the sum of the moments of inertia of the various masses.

SPECTRUM OF A PART OF THE BASIC IMAGE GROUP

Let us assume two product values of the generic element, of which a. one is a value to be referred to as stabilizing and indicated by P.

b. the other is a value of state referred to as generating and indicated by Q, the point of reference being the focal point $\Omega$.

Let us assume a part K of the base model group J.

The SPECTRUM of K is the following diagrammatic representation of K (see FIG. 11) in which every current element $i_e$ pertinent to K is represented by a RAY in which a. the amplitude is proportional to the value U$e$ assumed on the element under consideration by the stabilizing value P.

b. the distance from the origin $\Omega$ of the diagram representing the focal point of Q is proportional to the value V$e$ which the generating value assumes on the element under consideration.

MOMENT OF INERTIA, RELATIVELY TO P, WITH RESPECT TO THE FOCAL POINT OF Q OF A CURRENT MODEL ELEMENT.

Let $i_e$ be a current element on which:

a. the stabilizing value P assumes the value U$e$ b. the generating value Q assumes the value V$e$.

By definition, the moment of inertia $M_e$ of $i_e$ relatively to P is with respect to the focal point $\Omega$ is given by the following formula:

$$M_e = Ue \times (Ve)^2$$

MOMENT OF INERTIA, RELATIVELY TO P, WITH RESPECT TO THE FOCAL POINT OF Q OF A PART OF THE BASIC IMAGE GROUP

Let K be a part of J.

By definition, the moment of inertia of K:$M_k$ is the sum of the moments of inertia of each of the current elements of K $$M_k = \sum_{eEK} M_e = \sum_{eEK} Ue \times (Ve)^2$$

FORMAL STATEMENT OF THE SECOND PRINCIPLE OF DIMENSIONAL SYNTHESIS

VALUATION OF ONE PART OF THE BASE GROUP.

I. Stabilizing value (value of being) P

In this case, since the model element is by definition a vector of $X_p$ (the vector space of evolution of P, assigned the internal law of addition), the $\pi$ value of P on K, which is a part of J, is the NORM, of the vector sum (in the sense of the law of addition of $X_p$) of all the vector elements $i_e$ pertinent to K:

$$\pi = \sqrt{\sum_{1E\mathscr{S}}\left(\sum_{eEK}\xi_e^1\right)_1^2}$$

In this case, the model element is a punctual element and no system of addition will allow a value Q to be associated with K. Dimensional synthesis makes use of the moment of inertia of K in order to valuate in Q terms any part K of J.

This means that the valuation of a part K of the base model group, in Q terms is a function not only of the values which Q assumes on the different current elements of K but also of the values which P assumes on these same elements.

Thus by definition, the P value of Q on K, which is a part of J, is the value of an imaginary current element a. on which the weighting value P would assume a value equal to the arithmetical sum of the values U$e$ of P on all the current elements $i_e$ pertinent to K.

b. the moment of inertia of which would be the same as that of K.

$$\Gamma = \sqrt{\frac{\sum_{eeK}\mu_e(Ve)^2}{\left(\sum_{eEK}\mu_e\right)}}$$

Any part K of j may be valued in accordance with the principle above stated, any group of parts becoming in turn capable of valuation according to the same principle, including the base group itself.

The term PYRAMID VALUATION has been used for this method of valuation step by step of the parts of a group possessing a treelike structure.

BRANCH

Extension of the method in order to apply it to the category of problems involving sequencing

STATEMENT OF THE THIRD PRINCIPLE OF DIMENSIONAL SYNTHESIS

In the introduction, the example given of a problem of sequencing was that of the choice of a car, where the product value concerned is the "value" of a car which is a value of state, and the characteristic factors are all economic safety and mechanical factors which have already been considered.

By application of simple valuation, with, as an optimum point, a FOCAL point which comprises in itself and at once, in the respective values of the factors which characterize it, the direction of the choice (in this case the focal point will be a fictional car which is ideal for use in town traffic), it is possible to calculate the value of all the cars on the market, relatively to this purpose, i.e. the distance from each punctual element representing a given car to the focal point. From the very first, the group of cars is sequenced and the best car is that whose punctual model element of which is nearest the focal point.

THEORETICAL DIFFICULTY OF SEQUENCING A MULTIDIMENSIONAL GROUP

Any unidimensional value attached to the generic element of a group gives rise to an application of this group in the body of the real numbers R and consequently provides this group with a structure of sequence allowing the current elements to be sequenced in a unique manner.

Any multidimensional value attached to the generic element of a group gives rise to a manner of applications of this group in R as the generic element has dimensions and, consequently, as many relations of sequence. The plurality of these relations of sequence is extremely awkward since it does not permit the current elements of the group to be considered as sequenced relative to the value involved. None of these relationships of order has in fact any reason for being taken among others as a relationship of a global sequence, even if it corresponds to the characteristic factor of definition of the most significant value.

The problem is still, therefore, how to sequence in a unique manner a base model group relatively to a given product value.

FORMAL STATEMENT OF THE THIRD PRINCIPLE OF DIMENSIONAL SYNTHESIS. UNIQUE SEQUENCING OF J AND ITS PARTS

Dimensional synthesis supplies the means for valuing, by a single representative number, any product value attached to the generic element of a base model group J or any part of this group, and therefore gives rise to singe application of the total of the parts of J in terms of R and consequently provides J with a structure of sequence which enables the current elements of J of parts of J to be sequenced in a unique manner relatively to the value under consideration.

Dimensional synthesis thus provides a solution to the many problems of classification or choice which have hitherto been thought of as insoluble by rational means.

The third principle of dimensional synthesis may be stated as follows:

Let us assume, a product value G of the generic element $i_e$ defined by L characteristic factors and pertinent to the base model group J in which is given the relation of sequence: "$i_a$ is better than $i_b$ as regards G" according to a criterion.

a. by a hierarchical distribution of the factors defining $G:(k_l)$; $l$ pertinent to the interval $(I,L)=L$ b. by a focal point $\Omega$ (or focal vector $\omega$), of coordinates (or components) $(x_o{}^l)$, expressing an ideal it is desired to attain.

Let us assume the subordinate vector space of evolution of the product value $G:X_G$ of L dimensions, assigned the intrinsic standard of measurement based on the hierarchy of the factors of the given criterion and related to the base of reference $\beta$.

Let us assume the subordinate punctual reduced space $X_G$ related to the optimum reference $(\Omega:\beta)$ when $\Omega$ is the focal point of the given criterion.

By definition, if the value is a value of state, the relationship of order "$i_a$ is better than $i_b$, as regards G" is equivalent to the relation of order "$i_a$ is nearer to $\Omega$ than $i_b$" which is expressed by:

$$\ll \sqrt{\sum_{l \in \mathscr{L}}(\xi_a{}^l)^2} \leq \sqrt{\sum_{l \in \mathscr{L}}(\xi_b{}^l)^2} \gg .$$

By definition, if the value is a value of being, the relationship or order "$i_a$ is better than $i_b$ as regards G" is equivalent to the relationship of order "$(\vec{i_a}-\vec{\omega})$ is smaller than $(\vec{i_b}-\vec{\omega})$" which is expressed by the same terms as are given above.

BRANCH 4

Extension of the method in order to apply it to the category of problems involving ASSOCIATION.

STATEMENT OF THE FOURTH PRINCIPLE OF DIMENSIONAL SYNTHESIS

The concept of association is a very common concept which is nonetheless difficult to rationalize.

When two shapes, two handwritings, two characters, two melodies are associated, that is to say, when they are similar without being completely identical, the difference is clearly perceivable but since the objects, individuals or entities concerned are multidimensional, it is difficult to conceive a measurement of the difference and, finally, it is felt to be impossible to determine if the two elements are very closely associated or very slightly so and whether, when there is a number of similar elements, some are more similar than others.

By simple valuation, and using as the optimum point one of the elements involved, the value product being possibly a concept which has no specific name but which represents all the factors of resemblance, it is possible to calculate the distance—in the case under consideration this term is perfectly adequate to express the measurement of an association—of each element from that which has been selected as the optimum point.

The same method may be repeated as many times as there are elements in the base group, a new element being selected each time as the optimum point. In this manner, the distance separating all the elements taken in twos, will be determined by the same unit of measurement.

It will then be decided that all the elements, the mutual distance of which is less than a given distance, are associated. It will also be possible to determine, among a number of elements associated with a given element, which is the most closely associated and which the least, etc.

FORMAL STATEMENT OF THE FOURTH PRINCIPLE OF DIMENSIONAL SYNTHESIS: ASSOCIATION OF TWO CURRENT ELEMENTS, RELATIVELY TO A PRODUCT VALUE.

As soon as the punctual or vector space of evolution of measurement, G: it $\supset c_G$ (or $X_G$) is provided is possible to define in this space, as is done traditionally, a topological structure based on the concept of distance or difference.

Let us assume the subordinate vector space of evolution of the L-dimensional product value $G:X_G$ of L dimensions, assigned an intrinsic standard of measurement related to the base of reference $\beta$.

Let the reduced punctual subordinate space $X_G$ be related to an optimum reference $(\Omega:\beta)$.

By definition, if the value is a value of state, the relation "$i_a$ is associated with $i_b$ as regards G" is equivalent to the relation "the distance which separated $i_a$ from $i_b$ is less than or equal to a predetermined value $\epsilon$ which may be as small as desired" and which is expressed by:

$$\sqrt{\sum_{1 \in \mathscr{L}}(\xi_a{}^1 - \xi_b{}^1)^2} \leq \epsilon$$

By definition, if the value is a value of being, the relationship: "$i_a$ is associated with $i_b$ as regards G" is equivalent to the relation "the norm of the vector element $(i_a - i_b)$ is lower than or equal to a predetermined value $\epsilon$ which may be as small as desired" and which is expressed by the same expression as above.

COMPARISON OF CURRENT ELEMENTS. GRAPH OF THE RELATION "$i_a$ IS ASSOCIATED WITH $i_b$"

The very concept of association, quite apart from topological structure which stems therefrom, gives rise to a very vast group of applications.

In fact, hitherto the problems of comparison (i.e. the search for current association elements as occurs, for example, in employment agencies, estate agencies, marriage bureaus, etc. in police problems, medical problems, problems of similarity etc.) could only be effected by seeking the identity of the elements or the INTERSECTION OF predetermined categories.

Dimensional synthesis, by reason of the concept of association which it provides, enables the extraction to be directly effected from a graph of the relation "$i_a$ is associated with $i_b$," a threshold $\epsilon$ being determined in advance (or starting from zero and automatically taking increasing values in an iterative progression). Moreover, in the same class of equivalence as the above relation and for a given threshold, it enables a relationship of order to be introduced and the most closely associated element to be selected with respect to every other element in the category.

FUNCTION IN TERMS OF J OR ON J AND THE CONCEPT OF CONTINUITY.

The base model group J considered as a part of the vector space of evolution of a product value G and assigned the intrinsic standard of measurement may be taken as the field of definition—or counter field—of an application, in particular of a function of points or vectors for which the concept of continuity and that of differentiability which stems therefrom may be introduced according to the traditional process.

BRANCH 5

Extension of the method in order to apply it to the category of problems of OPTIMIZATION

STATEMENT OF THE FIFTH PRINCIPLE OF DIMENSIONAL SYNTHESIS

The fifth principle of dimensional synthesis supplies a new concept, with respect to the other principles, namely that of evolution (in the general sense of the word). The groups considered in the other branches of the theory were considered statically, i.e. in a given state which is assumed to be immutable in time.

In branch 5 it is a question of groups considered dynamically, i.e. as being in a process of evolution.

In the vector space of a given problem, any punctual element in evolution defines a trajectory. Since the vector space is assigned a unit of measurement of lengths and distance, the length of any trajectory may be measured.

In the sense of dimensional synthesis, to optimize a solution is to seek to shorten the trajectory. The statement of the fifth principle of dimensional synthesis is confused with this assertion which might appear to be disclosure; the shortest path between two points is in the form of a straight line. In fact, this is not a disclosure since the straight line in question is not geometrical and is situated in a vector space of N dimensions.

TRAJECTORY OF A CURRENT ELEMENT

Let us assume an application of the vector space with one dimension "time" in $\supset c_G$ which is the punctual space of evolution of a product value G assigned the intrinsic standard of measurement and which for any value of time causes a value of G to correspond to a given current element $i_r$.

The trajectory of $i_r$ is the counter field in G in the application under consideration.

Since the underlying space has a unit of measurement, the concept of the length of a trajectory between two punctual elements $i_a$ and $i_b$ on this trajectory takes on a meaning. This is the curvilinear integer along this trajectory, taken between the points $i_a$ and $i_b$:

$$\int_{i_b}^{i_a} ds$$

FORMAL STATEMENT OF THE FIFTH PRINCIPLE OF DIMENSIONAL SYNTHESIS: OPTIMUM DIRECTED EVOLUTION BETWEEN TWO POINTS—SITUATION.

Let the subordinate vector space of evolution of the L-dimensional product value $G:X_G$ be, assigned the intrinsic standard of measurement and related to the base of reference $\beta$.

Let us assume the reduced subordinate vector punctual space G related to an optimum reference $(\Omega:\beta)$.

By definition, the shortest path between two points in the punctual space G is that with the shortest trajectory, i.e. the hyperstraight line connecting these two points.

It is thus possible in order to optimize by projection of the law of evolution along the rectilinear trajectory on the different vectors of the natural base, to determine the parallel laws of evolution of the all characteristic factors determining the product value.

SPHERES OF EQUIVALENCE

In the punctual space of evolution G of the product value, G related to an optimum reference $(\Omega:\beta)$ all the punctual elements located on the same sphere, centered at $\Omega$, that is to say equidistant from the optimum point, have, by definition, the same measured value and are thus equivalent.

In other words, given the relation of equivalence $r$; "$i_a$ has the same value as $i_b$,"the quotient group $\supset c_G /r$ is the group of spheres centered at the optimum point.

The concept of a sphere of equivalence enables the concept of PROGRESS to be expressed in value terms. In fact the orthogonal passage from one given sphere towards a smaller sphere concentric therewith, determines, for any point in the field of variation, the greatest progress for the smallest outlay.

DESCRIPTION OF THE SUBSIDIARY PROGRAMS

Elementary subsidiary program No. 1; FREE STANDARD OF MEASUREMENT

Symbolic designation in program: Fremeasure

This subsidiary program expresses the free form of the basic principle of dimensional synthesis defining the intrinsic standard of measurement in the vector space of the problem associated with a given product value, and calculates for all the values of the index $n$;

the standard deviation value $\sigma_n$ of the distribution of the factor $fn$ the step $p_n$ of the factor $fn$ the term $g_n$ of the matrix of the scalar product the length $\Delta$ of the diagonal of the pave type according to the following expressions;

$$\sigma_n = \sqrt{\frac{\sum_{e=E_1}^{E_2}(x_e^n - x^n_{Mean})^2}{E_2 - E_1 + 1}}$$

$$P_n = \frac{\sigma_n}{\delta \cdot k_n}$$

$$g_n = \frac{1}{P_n^2}$$

$$\Delta = \delta \sqrt{\sum_{n=N_1}^{n=N_2} k_n^2}$$

in which $x_e^n$ = the $n$ component or coordinate of the element with index $e$, $\frac{n}{\text{average}}$ = the average value of the distribution of the factor $fn$, $E\ E2-E1+1$ = the number of elements in the base group
$\delta$ = the standard
$k_n$ = the hierarchical coefficient of the factor $f_n$,
$N1$ = the minimum limit of the index $n$ defining the factors of the product value,
$N2$ = the maximum limit of the index $n$ defining the factors of the product value. As shown in FIG. 12, the computer programs are read into the computer followed by the input data. An output device, such as a printer is also provided.

The expression of the subsidiary program in the ALGOL language is shown below:

Elementary Subroutine No. 1

FREMEASURE

PROCEDURE FREMEASURE (X, K, N1, N2, E1, E2, DELTA, G);
INTEGER N1, N2, E1, E2;
REAL DELTA, STANDARD;
ARRAY X, K, G;
BEGIN
REAL NSUM, ESUM, SIGMA, XMEAN, Z, P;
NSUM: = 0
FOR N: = N1 STEP 1 UNTIL N2 DO
  BEGIN
  ESUM: = 0;
  FOR E: = E1 STEP 1 UNTIL E2 DO
  ESUM: = ESUM + X [E,N];
  XMEAN: = ESUM / (E2−E1+1);
  ESUM: =0;
  FOR E: = E1 STEP 1 UNTIL E2 DO
  BEGIN
  Z: = X [E,N] − XMEAN;
  ESUM: = ESUM + (Z*Z);
  END
  SIGMA: = SQRT (ESUM/(E2−E1+1));
  P: = SIGMA/(K[N] * STANDARD);
  G[N]: = 1 / (P*P);
  NSUM: = NSUM + (K[N] * K[N]);
END LOOP N;
DELTA: = STANDARD * SQRT (NSUM);
END PROCEDURE FREMEASURE;

The above program solves the equations given above for the free standard of measurement.

Elementary subsidiary program No. 2: IMPOSED STANDARD OF MEASUREMENT

Symbolic designation in program: IMPMEASURE

This subsidiary program is the IMPOSED expression of the basic principle of dimensional synthesis defining the intrinsic standard of measurement in the vector space of the problem associated with a given product value, and for all the values of the index $n$, it calculates;

the interval of variation $i_n$ of the distribution of the factor $f_n$,
the step $p_n$ of the factor $f_n$
the term $g_n$ of the matrix of the scalar product
the length $\Delta$ of the diagonal of the field of variation in accordance with the following expressions;

$$\Delta = \delta \sqrt{\sum_{n=N_1}^{n=N_2} k_n^2}$$

$$P_n = \frac{x_M^n - x_m^n}{\delta \cdot k_n} = \frac{i_n}{\delta \cdot k_n}$$

$$g_n = \frac{1}{P_n^2}$$

in which $x_M^n$ = the components or coordinates of the maximum limiting elements.
$x_m^n$ = the components or coordinates of the minimum limiting element,
$\delta$ = the standard
$k_n$ = the hierarchical coefficient of the factor $f_n$
$N1$ = the minimum limit of the index $n$ defining the factors of the product value,
$N2$ = the maximum limit of the index $n$ defining the factors of the product value.

The expression of the subsidiary programs in the ALGOL Language is shown below:

Elementary Subroutine No. 2

IMPMEASURE

PROCEDURE IMPMEASURE (XMIN, XMAX, K, N1, N2, DELTA, G);
INTEGER N1, N2;
REAL DELTA, STANDARD:
ARRAY XMIN, XMAX, K, G;
BEGIN
REAL SUM, I, P;
SUM: = 0;
FOR N: = N1 STEP 1 UNTIL N2 DO
  BEGIN
  I: = XMAX [N] − XMIN [N];
  P: = I/ (K[N] * STANDARD);
  G[N]: = I/ (P*P);
  SUM: = SUM + (K[N] * K[N]);
  END;
DELTA: = STANDARD * SQRT (SUM);
END PROCEDURE IMPMEASURE:

The above program solves the equations given above for the imposed standard of measurement. 93 Elementary subsidiary program No. 3: Simple absolute valuation—symbolic designation ASIMPLEVAL This subsidiary program is the expression of the first principle of dimensional synthesis.

It calculates for any element the absolute value assumed by the product value to be expressed in value terms in accordance with the following expression:

$$\nu = \frac{100}{\Delta} \sqrt{\sum_{l=L_1}^{l=L_2} \left( \frac{x^l - x_0^l}{P_l} \right)^2}$$

in which $x^l$ = the component or coordinate of the elements
$x_0^l$ = the component of coordinate of the optimum element
$P_l$ = the step of the $l$ factor characteristic
$L1$ = the minimum limit of the index $l$ defining the factors of the product value
$L2$ = the maximum limit of the index $l$ defining the factors of the product value Δ = the length of the diagonal of the parallelepiped defining the standard of measurement ν = the value assumed on the element under consideration by the product value.

The expression of the subsidiary program in ALGOL Language is shown below:

Elementary Subroutine No. 3

ASIMPLEVAL

PROCEDURE ASIMPLEVAL (X, G, DELTA, L1, L2, ELEM1, ELEM2, V);
INTEGER L1, L2, ELEM1, ELEM2;
REAL DELTA, V;
ARRAY X, Y, G;
BEGIN
REAL SUM, Z;
INTEGER L;
SUM: = 0;
FOR L: = L1 STEP 1 UNTIL L2 DO
  BEGIN
  Z: = X[ELEM1, L] − X [ELEM2, L];
  SUM: = SUM + (G[L] * Z * Z);
  END
V: = (100 /DELTA * SQRT (SUM)) + 0.5;
END PROCEDURE ASIMPLEVAL;

The above program solves the simple absolute valuation equation given above.

Subsidiary program element No. 4: SIMPLE RELATIVE VALUATION

Symbolic designation in program RSIMPLEVAL

This subsidiary program is the expression of the first principle of dimensional synthesis.

It is identical with subsidiary program No. 3 except that it calculates the relative value and not the absolute value assumed on any element by the product value to be expressed in value terms, in accordance with the following expression, $$\nu = \sqrt{\sum_{1=L_2}^{1=L_1} \left(\frac{x^1 - x_0^1}{P_1}\right)^2}$$

in which
$x^1$ = the 1 component or coordinate of the element,
$x_o^1$ = the 1 component or coordinate of the optimum element,
$P1$ = the step of the characteristic 1 factor
$L1$ = the minimum limit of the index 1 defining the factors of the product value,
$L2$ = the maximum limit of the index 1 defining the factors of the product value,
$\nu$ = the value assumed in the element considered by the product value.

The expression of this subsidiary program in the ALGOL Language is shown below:

Elementary Subroutine No. 4

RSIMPLEVAL

PROCEDURE RSIMPLEVAL (X, G, DELTA, L1, L2, ELEM1, ELEM2, V);
INTEGER L1, L2, ELEM1, ELEM2;
REAL DELTA, V;
ARRAY X, G;
BEGIN
REAL SUM, Z;
SUM: = 0;
FOR L: = L1 STEP 1 UNTIL L2 DO
  BEGIN
  Z: = X[ELEM1, L] − X [ELEM2, L];
  SUM: = SUM + (G[L] * Z * Z);
  END
V: = SQRT (SUM) + 0.5;
END PROCEDURE RSIMPLEVAL:

The above program solves the relative absolute value equation given above.

Elementary subsidiary program No. 5: PYRAMID VALUATION

Symbolically designated in the program as Stapyrval

This subsidiary program is the expression of the second principle of dimensional synthesis.

It calculates the value assumed by the stabilizing value on any part K of the base group in accordance with the following expression, $$\pi = \frac{100}{\Delta} \sqrt{\sum_{1=L_1}^{1=L_2} \left(\frac{\left(\sum_{e=E_1}^{e=E_2} x_e^1\right)}{P_1}\right)^2}$$

in which
$x_e^1$ = 1 component of the index element $e$
$E1$ = the minimum limit of the index $e$ defining the part K
$E2$ = the maximum limit of the index $e$ defining the part K
$L1$ = the minimum limit of the index 1 defining the factors of the product value,
$L2$ = the maximum limit of the index 1 defining the factors of the product value,
$\Delta$ = the length of the diagonal of the parallelepiped defining the standard of measurement,
$\pi$ = the value of the stabilizing value on the part K.

In fact, this subsidiary program merely elaborates the addition on the index element and makes use of subsidiary program No. 3 ASIMPLEVAL for calculating the valuation.

The expression of the subsidiary program in the ALGOL Language is shown below:

Elementary Subroutine No. 5

STAPYRVAL

PROCEDURE STAPYRVAL (X, G, DELTA, E1, E2, L1, L2, P1);
INTEGER E1, E2, L1, L2;
REAL DELTA, P1;
ARRAY X, G;
BEGIN
INTEGER ELEM1, ELEM2;
REAL SUM;
ARRAY Y[1:2, L1:L2];
FOR L: = STEP 1 UNTIL L2 DO
  BEGIN
  SUM: = 0;
  FOR E: = E1 STEP 1 UNTIL E2 DO
  SUM: = SUM + X [E, L];
  Y[1, L]: = SUM;
  Y[2, L]: = X[0, L];
  END
ELEM1: = 1;
ELEM2: = 2;
ASIMPLEVAL (Y, G, DELTA, L1, L2, ELEM1, ELEM2, P1);
END PROCEDURE STAPYRVAL;

The above program solves the stabilizing value equation above.

Elementary subsidiary program No. 6 PYRAMID VALUATION

Symbolic designation in program: GENPYRVAL

This subsidiary program is the expression of the second principle of dimensional synthesis.

It is used mainly to calculate the value assumed by the generating value on any part of K of the base group and, in addition, the moment of inertia of the elements in this part in accordance with the following expressions:

$$M_e = U_e(V_e)^2$$

$$\Gamma = \sqrt{\frac{\sum_{e=E_1}^{e=E_2} Ue(Ve)^2}{\sum_{e=E_1}^{e=E_2} Ue}}$$

in which
$U$ = the value of the stabilizing value
$V$ = the value of the generating value
$E1$ = the minimum limit of the index /e defining the part K
$E2$ = the maximum limit of the index e defining the part K
$M_e$ = the moment of inertia of the index element e
$\Gamma$ = the value of the generating value on the part K.

The expression of the subsidiary program in the ALGOL Language is shown below:

Elementary Subroutine No. 6

GENPYRVAL

```
PROCEDURE GENPYRVAL (U, V, E1, E2, M, GAMMA);
INTEGER E1, E2;
REAL GAMMA;
ARRAY U, V, M;
BEGIN
REAL NUMESUM, DENOSUM, NUMETERM;
NUMESUM: = 0;
DENOSUM: = 0;
FOR E: = E1 STEP 1 UNTIL E2 DO
   BEGIN
   NUMETERM: = U[E] * V[E] * V[E];
   NUMESUM: = NUMESUM + NUMETERM
   M[E]: = NUMETERM/1000;
   DENOSUM: = DENOSUM + U[E];
   END;
GAMMA: = SQRT (NUMESUM/DENOSUM);
END PROCEDURE GENPYRVAL;
```

The above program solves the generating value equations given above.

Elementary subsidiary program No. 7: CLASSING

This subsidiary program does not contain anything original and may effect only a simple classification of the values established by the other subsidiary programs.

The expression of this subsidiary program in the ALGOL Language is shown below:

Elementary Subroutine No. 7

CLASSING

```
PROCEDURE CLASSING (TABLRA, NOMBRA, PHRA,
CLRA, RANRA);
REAL ARRAY TABLRA;
INTEGER NOMBRA, RANRA, CLRA;
BEGIN
INTEGER ROW 1, IRA, JRA, VRA, ARA, PH, RESJ,
PRA, PPRA;
   REAL ARRAY RRA [1, PHRA];
   SRA [1, PHRA], IPRA [1, PHRA];
   ROW 1: = 0;
   ARA: = L;
   IRA: = 0;
   FOR VRA: = 1 STEP 1 UNTIL NOMBRA DO
      BEGIN
      IRA: = IRA + ARA
      FOR PH: = 1 STEP 1 UNTIL PHRA DO
         BEGIN
         RRA [PH]: = TABLRA [IRA, PH];
         END;
      ARA: = 1
      FOR RA: = IRA + 1 STEP 1 UNTIL NOMBRA DO
         BEGIN
         SRA [PH]: = TABLRA [JRA, PH];
         END;
      IF INTEGER (RRA[CLRA]) ≠ INTEGER (SRA[CL-
      RA]) THEN GO TO RUN 2;
      ARA: = 0
      FOR PH: = 1 STEP 1 UNTIL PHRA DO
         BEGIN
         IPRA [PH]: = SRA [PH];
         RRA [PH]: = SRA [PH];
         END;
      RESJ: = JRA;
      GO TO RUN 1
RUN 2: FOR PH: = 1 STEP 1 UNTIL PHRA DO
      BEGIN
      IPRA [PH]: = RRA [PH];
      END
RUN 1: END
      PPRA: = INTEGER (IPRA [CLRA]);
      IF PPRA = PRA THEN GO TO RUN 3;
      ROW 1: = ROW 1 + 1;
RUN 3: PRA: = PPRA;
      IF RANRA = 1 THEN GO TO RUN 7;
      IF ROW 1 = 1 THEN GO TO RUN 4;
      SPACE (5); EXE (3, ROW 1);
      SPACE (2); EXL (ME);
      GO TO RUN 5;
RUN 4:
      SPACE (5); EXE (3, ROW 1);
      SPACE (2); EXL (ER)
RUN 5:
      SPACE (6)
RUN 7:
      SPACE (5)
      FOR PH: = 1 STEP 1 UNTIL PHRA DO
         BEGIN
         EXD (3, 0, IPRA [PH]);
         SPACE (10);
         END
      PRINT;
      IF ARA = 1 THEN GO TO RUN 6;
      ARRAY [RESJ, CLARA]: 99.99
RUN 6:
   END
END PROCEDURE CLASSING;
```

The above program solves the classing problem presented above.

DESCRIPTION OF TWO PROGRAMS

Program CONTROL ACTIVITY

The natural generic element of the problem is a company, a factory, a department or division, a subsidiary, a service, or a sector.

The natural base group of which the elements or parts are to be expressed in value terms is a financial group (group of firms), a division (group of factories) a department (group of services), etc.

The stabilizing value to be expressed in value terms is IMPORTANCE.

The generating value to be expressed in value terms is PROSPERITY.

The model provides the Importance-Prosperity spectrum for every part of the base group as well as its overall importance and prosperity.

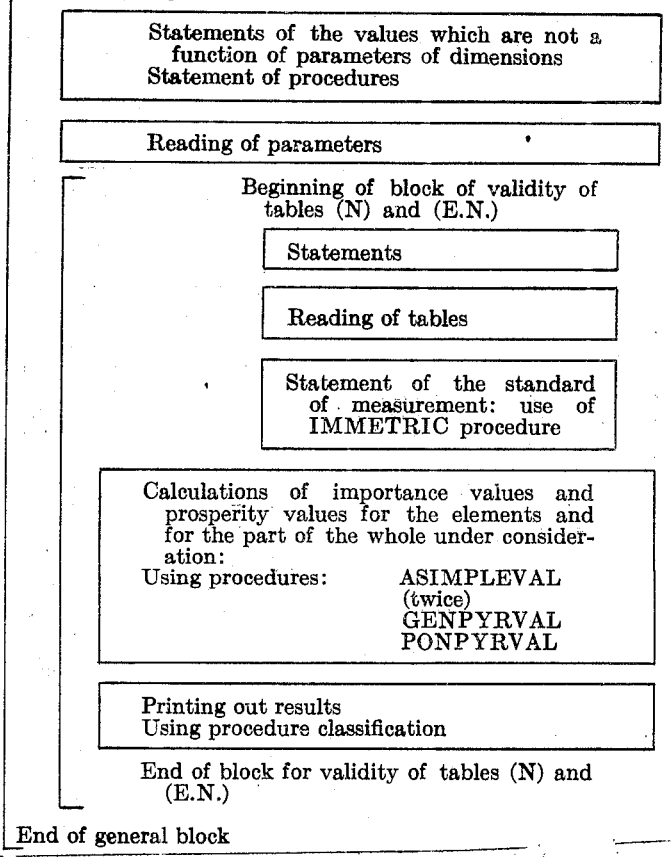

Model CONTROL OF ACTIVITY

Dictionary of Identifiers

| | |
|---|---|
| NUMBER | Complete number of the problem and present test |
| STABAD | Number of dimensions of the stabilizing value |
| GENERAD | Number of dimensions of the generating value |
| STANDARD | Standard |
| MAXIMUM | Table of coordinates or components of the maximum limit element |
| MINIMUM | Table of coordinates (components) of the minimum limit element |
| AIM | Table of coordinates or components of the point or vector of aiming |
| HIERARCHY | Table of hierarchical coefficients |
| NB FACTORS | Number of characteristic factors in the problem : N |
| NB ELEMENTS | Number of elements in the base group : E |
| STEP | Step |
| STAMEIRIC | Table of terms $g_n$ of the scalar products of the *stabilizing value |
| GENMETRIC | The generating value |
| STADIAG | Length of the diagonal in the field of variation of the stabilizing value |
| GENDIAG | Length of diagonal in the field of variation of the generating value |
| VALSTA | Value of the stabilizing value on an element |
| VALGEN | Value of the generating value on an element |
| STAVALPART | Value of the stabilizing value on one part of the base group |
| GENVALPART | Value of the generating value on one part of the base group |
| FACTORS | Table of characteristic factors comprising the reference numeral of each element. |

*Table of terms $g_n$ of the scalar products of the generating value.

Model "Control of Activity"
(Imposed standard of measurement)

DONNEES

| DATE |
| NUMERO |
| NBELEMENTS |
| PONDERAD | Dimension parameters
| GENERAD |
| ETALON |

MINIMUM / MAXIMUM (N)

HIERARCHY (N)

FACTORS (0 to E, N)

PROGRAM

BEGIN COMMENT MODEL MATRIX OF ACTIVITY;
INTEGER E, H, N, EMIN, EMAX, NUMBER,

```
            NBELEMENTS, NBCOLUMNS, NBFACTORS,
        STABAD, GENERAD, COLCLASS, ROW,
        DAY, MONTH, YEAR;
    REAL STADIAG, VALSTA, STAVALPART, GENDIAG,
    VALGEN,
        GENVALPART, STANDARD;
    PROCEDURE IMPMEASURE (--
    PROCEDURE ASIMPLEVAL (--
    PROCEDURE GENPYRVAL (--
    PROCEDURE STAPYRVAL (--
    PROCEDURE CLASSING (--
    READ (DAY, MONTH, YEAR, NUMBER, NBELEMENTS,
    STABAD,
        GENERAD, VALGEN, GENVALPART, STANDARD)
    BEGIN COMMENT ARRAY VALIDITY BLOCK;
    ARRAY MINIMUM, MAXIMUM,
        HIERARCHY [1: NBFACTORS],
        FACTORS [0 NBELEMENTS,
        0 NBFACTORS],
        STAMETRIC [1: STABAD],
        GENMETRIC [1: GENRAD],
        IMPORTANCE, PROSPERITY,
        CHARGE [1: NBELEMENTS],
        RESULTS [1: NBELEMENTS, 1:4];
    LOAD (MINIMUM); LOAD (MAXIMUM);
    LOAD (HIERARCHY); LOAD (FACTORS);
    NMIN: = 1
    NMAX: = STABAD
    IMPMEASURE (MINIMUM, MAXIMUM,
        HIERARCHY, NMIN, NMAX, STADIAG,
        STAMETRIC);
    NMIN: = STABAD + 1;
    NMAX: = NBFACTORS;
    IMPMEASURE (MINIMUM, MAXIMUM,
        HIERARCHY, NMIM, NMAX,
        GENDIAG, GENMETRIC);
    H: = 0
    FOR E: 1 STEP 1 UNTIL NBELEMENTS DO
        BEGIN COMMENT BLOCK FOR TREATMENT
        OF AN ELEMENT;
        NMIN: = 1;
        NMAX: = STABAD;
        ASIMPLEVAL (FACTORS, STAMETRIC,
        STADIAG, NMIN, NMAX, E,
        H, VALSTA);
        IMPORTANCE [E]: = VALSTA;
        NMIN: = STABAD + 1;
        NMAX: = NBFACTORS;
        ASIMPLEVAL (FACTORS, GENMETRIC,
        GENDIAG, NMIN, NMAX, E,
        H, VALGEN);
        PROSPERITY [E]: = VALGEN; END BLOCK FOR
    TREATMENT OF AN ELEMENT:
    EMIN: = 1
    EMAX: = NBELEMENTS;
    GENPYRVAL (IMPORTANCE, PROSPERITY, EMIN,
    EMAX,
        CHARGE, GENVALPART);
    NMIN: = 1;
    NMAX: = STABAD;
    STAPYRVAL (FACTORS, EMIN, EMAX,
        NMIN, NMAX, STAVALPART);
    FOR E: = 1 STEP 1 UNTIL NBELEMENTS DO
        BEGIN
        RESULTS [E, 1]: = FACTORS [E, O];
        RESULTS [E, 2]: = PROSPERITY [E];
        RESULTS [E, 3]: = IMPORTANCE [E];
        RESULTS [E, 4]: = CHARGE [E];
        END;
    EXL ('!!!'); PRINT;
    EXL (' C-M-C   MODEL
        MATRIX OF ACTIVITY')
    PRINT;
    EXL ( !! ); SPACE (20);
    EXL ('SPECTRUM  IMPORTANCE-PROSPERITY');
    PRINT; SPACE (22);
    EXL ('DN    N-:');
    EXD (6, 2 NUMBER);
    PRINT; EXL ('!  ROW'); SPACE (8);
    EXL ('REFER'); SPACE (8);
    EXL ('PROSPERITY  IMPORTANCE  CHARGE');
    PRINT;
    ROW: = ∅;
    COLCLASS: = 2; NBCOLUMNS: 4;
    CLASSING (RESULTS, NBELEMENTS, NBCOLUMNS,
        COLCLASS, ROW);
    EXL ('!!!!'); PRINT;
    SPACE (14);
    EXL ('IMPORTANCE  GLOBAL  :');
    EXD (7, ∅, STAVALPART); PRINT;
    EXL ('!'); SPACE (14);
    EXL ('PROSPERITY GLOBAL  :');
    EXD (4, ∅, GENVALPART); PRINT;
    END BLOCK FOR VALIDITY OF ARRAYS;
    END GENERAL BLOCK;
```

Program Selection 1

The natural generic element of the problem may be anything at all; a candidate, a store, an office, an association, an offer to supply goods, a site, a piece of equipment, a technical solution, etc.

The product value to be expressed in terms of quantity is the concept to which the choice relates; the competence of the candidate, the situation in the store, the quality of the offer, the value of the site or equipment or solution, etc.

The model provides the list of elements, classified from the best to the worst, with the position of each, each reference numeral and its absolute value in the sense of dimensional synthesis.

Model   Choice I   Free standard of measurement

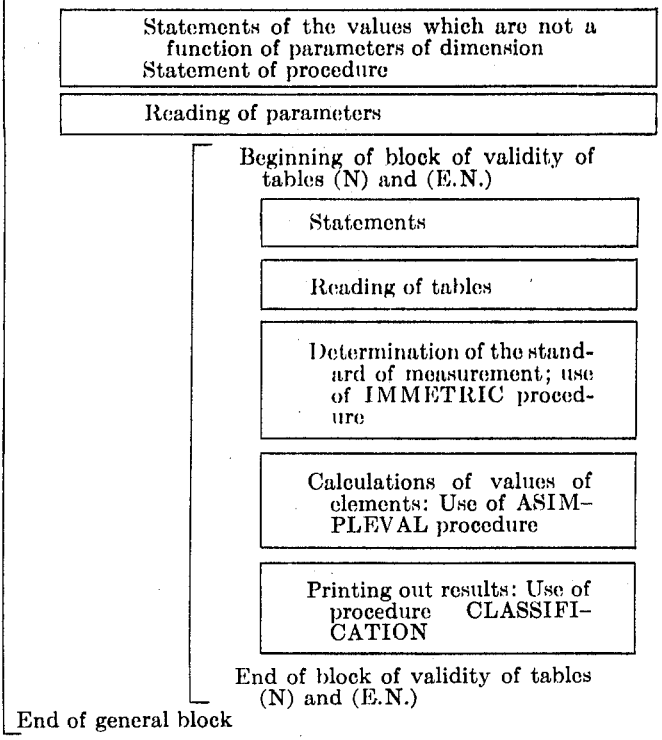

Model Choice I   Free Standard of measurement

Date

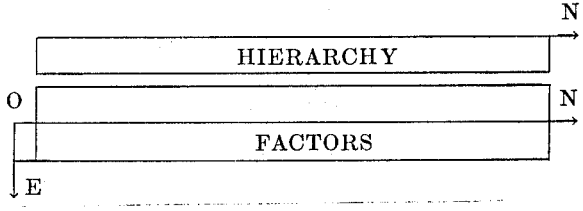

Model "CHOICE 1"

PROGRAM

BEGIN COMMENT MODEL CHOICE 1;
INTEGER E, N, EMIN, EMAX, NMIN,
 NMAX, NUMBER, NBELEMENTS,
 NBCOLUMNS, NBFACTORS, COLCLASS,
 ROW, DAY, MONTH, YEAR;
REAL DIAGONAL, VALUE, STANDARD;
PROCEDURE FREMEASURE (--
PROCEDURE ASIMPLEVAL (--
PROCEDURE CLASSING (--
READ (DAY, MONTH, YEAR, NUMBER,
 NBELEMENTS, NBFACTORS, STANDARD);
BEGIN COMMENT BLOCK FOR VALIDITY OF
 ARRAYS;
 ARRAY HIERARCHYM, ETRIC [1: NBFACTORS],
 FACTORS [∅: NBELEMENTS, 0: NBFACTORS],
 RESULTS [1: NBELEMENTS, 1:2];
LOAD (HIERARCHY); LOAD (FACTORS);

EMIN: = NMIN: = 1;
EMAX: = NBELEMENTS;
NMAX: = NBFACTORS;
FREMEASURE (FACTORS, HIERARCHY,
60  NMIN, NMAX, EMIN, EMAX,
 DIAGONAL, METRIC);
H: = ∅;
FOR E: = 1 STEP 1 UNTIL NBELEMENTS DO
 BEGIN COMMENT BLOCK FOR TREATMENT OF
65  AN ELEMENT;
 RESULTS [E, 1]: = FACTORS [E, 0];
 ASIMPLEVAL (FACTORS, METRIC, DIAGONAL,
 NMIN, NMAX, E, H, VALUE);
 RESULTS [E, 2]: = VALUE;
70 END BLOCK FOR TREATMENT OF AN ELEMENT;
EXL ('!!! C-M-C   MODEL   CHOICE-1');
SPACE (30);
EXE (5, DAY, MONTH, YEAR);
PRINT;
75 EXL ('!!'); SPACE (20);

EXL ('CLASSING OF N-:');
EXD ( 6,2, NUMBER); PRINT; SPACE (17);
EXL ('ROW REFERENCE VALUE');
PRINT; ROW: = 0;
COLCLASS: = 2; NBCOLUMNS: = 2;
CLASSING (RESULTS, NBELEMENTS, NBCOLUMNS, COLCLASS, ROW);
END BLOCK FOR VALIDITY OF ARRAYS;
END GENERAL BLOCK;

I claim:

1. A method of operating a general purpose digital computer to perform the measurement known as dimensional synthesis for expressing in terms of quantity, subjective multidimensional concepts known as product values, each defined by N characteristic FACTORS and consisting in:
   a. representing the objects, individuals or entities to which every product value which it is desired to express in terms of quantity is related, by the elements of a vector space of N dimensions and its reduced punctual space corresponding biunivocally to the N factors defining this value,
   b. assigning a standard of measurement to the vector space and establishing a hierarchical relationship between the said factors of definition,
   c. calculating the measurement of the product value on each element when its support is an element of the vector space by the norm of the said element and when its support is an element of the reduced punctual space, by the distance from this element to a punctual optimum element representing the individual object or entity considered as ideals relatively to the product value concerned,
   d. calculating the measurement of the product value of any group of elements by the norm of the vector sum in the case of elements of the vector space and by the distance to the optimum point from an imaginary point, the moment of inertia of which would be the same as that of the group, in the case of elements of the reduced punctual space,
   e. finally classifying the elements on the basis of the measurement values thus calculated.

2. A method of measurement as claimed in claim 1, wherein in a first type of application, the measurement known as the imposed standard of measurement is obtained in the vector space and there defines a scalar product such as a parallelepiped constructed on the intervals of variation of the distribution of the factors of the rectangular parallelepiped, the length of the faces of which remain in the same proportion to each other as the homologous hierarchical coefficients.

3. A method of measurement as claimed in claim 1, wherein in a second type of application, the standard of measurement known as the free standard of measurement is obtained in the vector space and there defines a scalar product such that the parallelepiped constructed on the standard deviation values of the distribution of factors is a rectangular parallelepiped, the lengths of the faces of which remain in the same proportion to each other as the homologous hierarchical coefficients.

4. A method of operating a general purpose digital computer to perform a measurement known as dimensional synthesis, for expressing in terms of quantity, certain subjective multidimensional concepts known as product values each being defined by N characteristic factors, comprising the steps of:
   a. representing the objects to which each product value desired to be expressed in terms of quantity is related, by the elements of an N-dimensional vector space and its reduced punctual space corresponding to the N factors defining said product value and reading numbers corresponding to these elements into a computer memory,
   b. assigning a standard of measurement to said vector space, establishing a hierarchical relationship between the said factors and entering numbers representing said relationship into said computer memory,
   c. using the numbers in said computer memory to calculate the measurement of said product value of each element, when it is an element of said vector space, by the norm of said element, and when it is an element of said reduced punctual space, by the distance from said element to a punctual optimum element representing the individual object considered as an ideal relative to the product value concerned and entering the result in said computer memory,
   d. using the numbers in said computer memory to calculate the measurement of the product value for any group of elements for the norm of the vector sum in the case of elements of said vector space and for the distance to the optimum point from an imaginary point, the moment of inertia of which would be the same as that of said group, in the case of elements of said reduced punctual space, and
   e. classifying the elements on the basis of the measurement values thus calculated.

5. An information-processing system for dimensional synthesis, wherein a plurality of entities is defined by a plurality of criteria organized in a balanced tree, of which initially only the extreme criteria, called characteristic factors, are quantified from said plurality of entities, so that all other criteria of the tree, called product values are not qualified; and wherein each characteristic factor is defined by an interval of variation, and a hierarchical coefficient indicative of the relative importance of the factor in relation to the other factors, and wherein the entities are represented by the elements of an N-dimensional vectoral space, the exact positional relation of these in each dimension of the vectoral space being associated with a characteristic factor, and wherein this vectoral space is measured by a product value such that each unitary vector of the vectoral position is the quotient of the interval of variation divided by the hierarchical coefficient of the corresponding characteristic factor, comprising the steps of:
   a. quantifying the product value of each entity concerned by calculating from it, when its image is in a vector, the NORM of the former, and, when its image is a point, the DISTANCE from the original point to this point,
   b. calculating, for all of a plurality of entities, when their image is a vector, the norm of the vector sum, and, when their image is a point, the distance from an origin point to an imaginary point at which the moment of inertia is equal to that of the plurality of entities, and
   c. classifying the values so derived.

6. A general purpose digital computer system having stored in the memory thereof a group of program subroutines comprising,
   a first subroutine, FREMEASURE, for causing the system to calculate the expression of the FREE form of dimensional synthesis which defines the intrinsic measurement in the vectoral space of the problem, associated by a given product value, said system calculating for all the values of the index $n$:
   the significant deviation of factor $f_n$, that is to say, in the case of deviation value $\sigma_n$ of the distribution factor $f_n$,
   the step $P_n$ of factor $f_n$,
   the term $g_n$ of the scalar product value,
   and the length of the pave-type diagonal, according to the following expressions:

$$\sigma n = \sqrt{\frac{\sum_{e=E1}^{e=E2}(x_e{}^n - x_{mean}{}^n)^2}{E2 - E1 + 1}}$$

$$P_n = \frac{\sigma n}{\delta \cdot k_n}$$

$$gn = \frac{1}{P_n{}^2}$$

$$\Delta = \delta \cdot \sqrt{\sum_{n=N1}^{n=N2} k_n{}^2}$$

in which
$x_e{}^n$ = the coordinate of row $n$ and index element $e$, $x_{mean}{}^n$ = the mean value of the distribution of the factor $f_n$, $E = E2 - E1 + 1$ = the number of elements of the base ensemble, $\delta$ = standard, $k_n$ = hierarchical coefficient of the factor $f_n$, $N1$ = minimum limit of the index $n$ defining the factors of the product value, and $N2$ = maximum limit of the index $n$ defining the factors of the product value, a second subroutine, IMPMEASURE, for causing the system to calculate the expression imposed from the basic axiom of the dimensional synthesis which defines the intrinsic measurement in the vectoral space of the problem, associated by a given product value, said system calculating for all values of the index $n$:

the significant deviation of factor $f_n$, that is to say, in the case of the interval of variation $i_n$ of the distribution factor $f_n$, the step $P^n$ of factor $f_n$, the term $g_n$ of the scalar product matrix, the length of the diagonal of the field of variation, according to the following expressions:

$$i_n = X_M{}^n - X_m{}^n$$
$$P_n = i_n 1(\delta \cdot k_n)$$
$$g_n = 1/P_n{}^2$$

$$\Delta = \delta \cdot \sqrt{\sum_{n=N1}^{n=N2} k_n{}^2}$$

in which $x_M{}^n$ = the coordinate of the maximum element limit, $x_m{}^n$ = the coordinate of the minimum element limit, $\delta$ = standard, $k_n$ = hierarchical coefficient of factor $f_n$, $N1$ = minimum limit of the index $n$ defining the product value factor, $N2$ = maximum limit of the index $n$ defining the product value factor, a third subroutine, ASIMPLEVAL, for causing the system to calculate, for all elements, the absolute value that the product value assumes, calculated according to the following expression:

$$v = \frac{100}{\Delta} \cdot \sqrt{\sum_{l=L1}^{l=L2} \left(\frac{X^l - X_0{}^l}{P_l}\right)^2}$$

wherein $x^l$ = coordinates of row 1 of the element, $x_0{}^l$ = coordinates of the row 1 of the optimal element, $P1$ = step of row 1 characteristic factor, $L1$ = minimal limit of the index 1 defining the factors of the product value, $L2$ = maximal limit of the index 1 defining the factors of the product value, $\Delta$ = length of the diagonal of the parallelepiped defining the standard of measurement, and $v$ = value of the element under consideration for the product value, a fourth subroutine, RSIMPLEVAL, for causing the system to calculate the relative value and not the absolute value that includes all elements, the product value, calculated according to the following expression:

$$v = \sqrt{\sum_{l=L1}^{l=L2} \left(\frac{X^l - X_0{}^l}{P_l}\right)^2}$$

wherein $x^l$ = coordinate of row 1 of the element, $x_0{}^l$ = coordinate of row 1 of the optimal element, $P_l$ = step of the characteristic factor of row 1, $L1$ = minimal limit of the index 1 defining the product value factors, $L2$ = maximal limit of the index 1 defining the product value factors, $v$ = value of the element under consideration for the product value, a fifth subroutine, STAPYRVAL, for causing the system to calculate the expression of the second principle of dimensional synthesis, said system calculating the value that assumes the stabilizing value on the entire portion K of the base group assembly, this subroutine elaborating simply the summation of the element index and using the third subroutine in order to calculate the valuation according to the following expression:

$$\pi = \frac{100}{\Delta} \cdot \sqrt{\sum_{l=L1}^{l=L2} \frac{\left(\sum_{e=E1}^{e=E2} x_e{}^l\right)^2}{P_l{}^2}}$$

wherein $x_e{}^l$ = coordinate of row 1 of index element $e$, $E1$ = minimal limit of the indicia defining part K, $E2$ = maximal limit of the indicia defining part K, $L1$ = minimal limit of the indicia 1 defining the factors of the product value, $L2$ = maximal limit of the indicia 1 defining the factors of the product value, $\Delta$ = length of the diagonal of the parallelepiped defining the measurement standard, and $\pi$ = value of the stabilizing value of part K, and a sixth subroutine, GENPYRVAL, for causing said system to calculate the value that the generator value assumes on the entire portion K of the base assembly, and, in addition, the moment of inertia of the elements of this portion according to the following expressions:

$$M_e = U_e \cdot (V_e)^2$$

$$\Gamma = \sqrt{\frac{\sum_{e=E1}^{e=E2} U_e \cdot (V_e)^2}{\sum_{e=E1}^{e=E2} U_e}}$$

wherein $U$ = value of the stabilizing value, $V$ = value of the generating value, $E1$ = minimal limit of the index defining the part K, $E2$ = maximal value of the index defining part K, $M_e$ = moment of inertia of the element of index $e$, and $\Gamma$ = value of the generating value of the part K.

7. A method of operating a general purpose digital computer system for treating input information comprising the steps of:

a. defining a group of objects by the criteria, organized according to a balanced branching structure, of which initially only the elementary criteria are provided as input information while all the other related criteria (called "composed criteria") are not provided as input information, wherein each elementary criterion is defined by:

a significant variation $\epsilon_n$ defining a unit of information which is chosen equal to the interval of variation, and a hierarchical coefficient $k_n$ defining relative importance of each elementary criterion in relation to the other criteria;

b. representing the objects by the vector elements of a vectorial space of N dimensions, each dimension of the vectorial space being associated with an elementary criterion, wherein the vectorial space is defined by a scale such that each single vector of the vectorial space is the quotient of the significant variation $\epsilon_n$ divided by the hierarchical coefficient $K_n$ of the elementary criterion; and c. determining the composed criteria by calculating the norm of the vector of each object whose image is a vector Z (with the components $z_n$), by calculating for each object, whose image is a point X, (of coordinates $x_n$), the distance from said point to an original point $\Omega$ (of coordinates $w_n$), and by utilization of mathematical terms for the norm of a vector and for the distance between two points, in a space at N orthogonal dimensions, as follows:

$$\text{Norm of the vector } z = B_n \sqrt{\sum_n A_n (Z_n)^2}$$

$$\text{Distance } X\Omega = B_n \sqrt{\sum_n A_n (x_n - w_n)^2}$$

where, the parameters $A_n$ and $B_n$ receive the following values:

$$A_n = K_n^2/\epsilon_n^2$$

$$B_n = \frac{100}{\Delta}$$

in the case of an absolute value with $$\Delta = \sqrt{\sum K_N^2}$$

and $B_n = 1$ in the case of a relative value.

8. A method according to claim 7 further comprising the steps of:

a. calculating the composed criteria by calculating, according to a pyramidal value procedure, the norm of the vector sum according to the procedure for the entire subgroup of objects whose images are the vectors; and b. calculating, for the entire subgroup of objects whose images are points, the distance $\Gamma$ from a point of origin to an imaginary point, of which the amount of inertia is equal to that of the subgroup, by utilization of the following term, from the norm of the vector, in a space of N orthogonal dimensions:

$$\text{norm} = B_n \sqrt{\Sigma A_n (z_{ne})^2}$$

whereby the parameters $A_n$ and $B_n$ receive the values such that the variable $z_{ne}$ receives the value $$\sqrt{Z_{ne} = \Sigma_e z_{ne}}$$

where $e$ is the index of the individual vector objects, and, in which, the following term is used:

$$\Gamma = \sqrt{\frac{\sum_0 Ue(Ve)^2}{\sum_0 Ue}}$$

where $V_e$ is the value that each object possesses for the criterion to be measured, and $U_e$ is the norm of the defined vector by the original point and the image point of the object considered.

* * * * *